(12) United States Patent
Moriya et al.

(10) Patent No.: US 7,099,041 B1
(45) Date of Patent: Aug. 29, 2006

(54) IMAGE DATA BACKGROUND DETERMINING APPARATUS IMAGE DATA BACKGROUND DETERMINING METHOD, AND MEDIUM RECORDING THEREON IMAGE DATA BACKGROUND DETERMINATION CONTROL PROGRAM

(75) Inventors: Hidekuni Moriya, Nagano-ken (JP); Naoki Kuwata, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/674,638

(22) PCT Filed: Mar. 2, 2000

(86) PCT No.: PCT/JP00/01216

§ 371 (c)(1),
(2), (4) Date: Nov. 2, 2000

(87) PCT Pub. No.: WO00/52922

PCT Pub. Date: Sep. 8, 2000

(30) Foreign Application Priority Data

Mar. 2, 1999 (JP) ................................. 11-054285
Mar. 2, 1999 (JP) ................................. 11-054286

(51) Int. Cl.
*H04N 1/40* (2006.01)
(52) U.S. Cl. ...................................... 358/1.9; 382/171
(58) Field of Classification Search ................ 358/1.9, 358/2.1, 522; 382/168–172
See application file for complete search history.

(56) References Cited

U.S. PATENT DOCUMENTS

| | | | | |
|---|---|---|---|---|
| 5,140,416 A * | 8/1992 | Tinkler | ......................... | 348/33 |
| 5,657,395 A | 8/1997 | Hirota | ......................... | 382/163 |
| 5,699,454 A | 12/1997 | Nakai et al. | ................. | 382/172 |
| 5,706,368 A | 1/1998 | Mita | ........................... | 382/284 |
| 5,850,298 A | 12/1998 | Narahara et al. | | |
| 6,222,949 B1 * | 4/2001 | Nakata | ........................ | 382/298 |

FOREIGN PATENT DOCUMENTS

| | | |
|---|---|---|
| EP | 0 845 716 A2 | 6/1998 |
| JP | 55056761 A | 4/1980 |
| JP | 01-196975 A | 8/1989 |
| JP | 01196971 A | 8/1989 |
| JP | 02000884 A | 1/1990 |
| JP | 02294163 A | 12/1990 |
| JP | 03044268 A | 2/1991 |
| JP | 04037258 A | 2/1992 |

(Continued)

*Primary Examiner*—Thomas D Lee
*Assistant Examiner*—Stephen Brinich
(74) *Attorney, Agent, or Firm*—Sughrue Mion, PLLC

(57) ABSTRACT

Background removal processing applies image processing indiscriminately to the whole image on the basis of an assumed presence of a background. Therefore, if the input image has a background and the luminance tone level of this background is relatively low, the background area cannot be removed.

It is made possible to scan a document with a color scanner 40 and determine a blank paper area constituting the background of the document image, i.e. a substantially white area, according to a prescribed frequency distribution of image data constituting the image. It is further made possible to provide clear contrast between the background of the image reproduced from image data and the non-background part of the image and to remove noise components appearing on the background, such as what is written or drawn on the wrong side of paper seen through, because, once the presence of a background is determined, the substantially white background area is retouched to white, i.e. the highest tone, by image data retouching according to a correction curve.

28 Claims, 29 Drawing Sheets

FOREIGN PATENT DOCUMENTS

| | | |
|---|---|---|
| JP | 04037259 A | 2/1992 |
| JP | 043131744 A | 11/1992 |
| JP | 07303188 | 11/1995 |
| JP | 08307722 A | 11/1996 |
| JP | 09-266539 A | 10/1997 |
| JP | 10164368 | 6/1998 |

* cited by examiner

FIG.18A

| 255 | 255 | 255 | 255 | 255 | 200 | 0 |
|-----|-----|-----|-----|-----|-----|---|
| 255 | 255 | 250 | 250 | 252 | 200 | 0 |
| 255 | 255 | 255 | 250 | 210 | 0   | 0 |
| 255 | 255 | 255 | 210 | 0   | 0   | 0 |
| 255 | 255 | 255 | 253 | 0   | 0   | 0 |

FIG.18B

| 255 | 255 | 255 | 255 | 255 | 255 | 0 |
|-----|-----|-----|-----|-----|-----|---|
| 255 | 255 | 255 | 255 | 255 | 255 | 0 |
| 255 | 255 | 255 | 255 | 255 | 0   | 0 |
| 255 | 255 | 255 | 255 | 0   | 0   | 0 |
| 255 | 255 | 255 | 255 | 0   | 0   | 0 |

IMAGE DATA BACKGROUND DETERMINING APPARATUS IMAGE DATA BACKGROUND DETERMINING METHOD, AND MEDIUM RECORDING THEREON IMAGE DATA BACKGROUND DETERMINATION CONTROL PROGRAM

TECHNICAL FIELD

The present invention relates to an image data background determining apparatus, an image data background determining method, and a medium recording thereon an image data background determination control program, and more particularly to an image data background determining apparatus, an image data background determining method, and a medium recording thereon an image data background determination control program for determining the presence or absence of a background in an image on the basis of the frequency distribution of image data constituting the image.

BACKGROUND ART

When a computer or the like handles an image, image data on the input image acquired from an image input device such as a scanner or a digital camera are expressed with picture elements in a dot matrix arrangement, and the picture elements express different tones (tone levels). In such a case, an image is often displayed on the CRT screen of the computer in 640 and 480 dots of picture elements in the horizontal and vertical directions, respectively.

Further, as each picture element has data expressing a color or brightness in tone, image processing is accomplished by varying these data.

This image processing includes, for document images or the like, processing to remove the background. The background of a document image in this context means the set of picture elements representing the blank area of the paper of the document, and it may include what is written on the back face of the paper seen through. Removing the background means maximizing the tone levels of picture elements representing the blank area of the paper. Thus, when the document image is to be printed after the image processing, the picture elements whose tone levels are maximized as stated above are not printed, and the area of these picture elements remains as blank paper. Therefore, the picture elements represented in the blank paper area are apparently removed, making it possible to obtain a print having clear contrast between the background and the characters. In such a case, the tone levels of picture elements having tones no less brighter than a prescribed threshold are maximized irrespective of the actual presence or absence of a background.

An example of application of this technique is a case in which it is used to prevent, where a sheet of document paper printed on both sides is to be read by a scanner, the image data on the wrong side of this document image from overlapping the image data on the right side. Since the image on the wrong side seen through would appear in the area of the right side where nothing is supposed to be printed, it is removed by maximizing the tone levels of picture elements in this area.

Thus, an area identified with a certain class of tone levels is determined to be the background, and picture elements in this area are subjected to processing for background removal and their tone levels are maximized.

DISCLOSURE OF THE INVENTION

The above-described image processing technique according to the prior art for background removal involves the following problems.

This background removal processing applies image processing indiscriminately to the whole image, irrespective of the actual presence or absence of a background, on the basis of an assumed presence of a background. Therefore it entails a problem that, if the input image has a background and the luminance tone level of this background is relatively low, the background area cannot be removed.

Furthermore, even though this background removal processing is carried out, it is impossible to apply the optimal background removal processing to each image that is entered because all images are uniformly processed, resulting in another problem that the background partly remains or the contrast between the background and the non-background image is lost.

Moreover, when this background removal processing is to be carried out, the reference area for determining the background is set as an area distinguished by a fixed prescribed tone level. Therefore, irrespective of whether the entered image is in color or monochrome, the same fixed set area is treated as the background.

In this case, if the reference area for determining the background is set according to the monochrome image, the range of tones to be determined as belonging to the background will become too wide, and the background removal processing applied to this range will eliminate much of color components because the tones of picture elements in a higher tone range of the color image will have the highest tone level.

On the other hand, if the reference area for determining the background is set according to the color image, the range of tones to be determined as belonging to the background will become too narrow, and the background removal processing will give a monochrome image insufficient in overall contrast.

The present invention, attempted in view of the above-noted problems, is intended to provide an image data background determining apparatus, an image data background determining method, and a medium recording thereon an image data background determination control program capable of determining the presence or absence of a background in an image on the basis of the frequency distribution of image data constituting the image; carrying out, if there is a background, prescribed image data retouching appropriate to that particular background; and thereby giving contrast between the background and the non-background part of the image to be reproduced from the image data; and further capable of carrying out retouching on the basis of an appropriately set background, preventing the loss of color components near the high tone level for a color image, giving contrast between the background and characters for a monochrome image, and thereby acquiring an attractively looking output.

In order to achieve the aforementioned object, according to a first aspect of the invention, there is provided a configuration provided with an image data acquisition unit for acquiring image data expressing in multiple tones an image in picture elements in a dot matrix arrangement; a frequency distribution charting unit for charting frequency distributions by totaling the picture elements of the image data acquired by the image data acquisition unit as classified by tone level; and a background determination unit for computing a statistical quantity representing the characteristic of a reference area demarcated by dividing the frequency distributions according to a prescribed tone level and, if that statistical quantity is a sufficient value to indicate the presence of a background, determining that the image has an area constituting a background.

According to the first aspect of the invention configured as described above, the image data background determining apparatus determines an area constituting a background in an image on the basis of a prescribed frequency distribution of picture elements constituting image data. In this case, the image data acquisition unit acquires image data expressing in multiple tones the image in picture elements in a dot matrix arrangement. Then, the frequency distribution charting unit analyzes the image data with which the picture elements acquired by the image data acquisition unit are provided, and totals the image data of the picture elements data as classified by tone level. Then it charts frequency distributions out of the result of totaling according to the tone level and the frequency of each tone. Here, the background determination unit, in the above-described frequency distributions, demarcates a reference area for determining the presence or absence of a background by dividing the frequency distributions according to a prescribed tone level, and computes a statistical quantity representing the characteristic of this reference area. If this statistical quantity has a sufficient area to determine that the image data have a background, the unit determines that the aforementioned image has a background.

Thus, the statistical quantity of a section demarcated by a prescribed tone level is computed from the frequency distributions of the tones of picture elements constituting the image data, and compared with a prescribed threshold to determine whether or not the entered image has a background.

More specifically, cases in which the relative frequencies or the total of frequencies in the reference area demarcated by this prescribed tone level are the prescribed threshold and overwhelmingly large and the standard deviation of this reference area is computed, and it is determined that there is a background where this standard deviation is not greater than the prescribed threshold.

It goes without saying that the aforementioned case in which the relative frequencies are overwhelmingly large means that they are overwhelmingly large in a range that can be deemed to be the background, but not they are perceived to be overwhelmingly large as numerically sensed. For instance, even if the relative frequencies in the reference area demarcated by the prescribed tone are only 15%, they may be considered overwhelmingly large relative to the area constituting the image.

This prescribed threshold may either be a fixed prescribed value or altered as appropriate according to the frequency distribution of the tones of the image data of the entered image.

The reference area demarcated by the prescribed tone level can be altered as appropriate according to the desired background to be determined: where a high tone background is to be determined, an area near the high tone can be demarcated, or where a low tone background is to be determined, an area near the low tone can be demarcated. The background in the entered image in this context means, where the entered image is a document image for instance, the set of picture elements representing the area of document paper, i.e. the background as such or what is written or drawn on the wrong side of the paper seen through. There is no particular limitation about the color components of the background, as they are altered as appropriate according to the background to be determined as stated above.

It is sufficient for the image data acquisition unit to be able to acquire image data expressing in multiple tones an image in picture elements in a dot matrix arrangement. Therefore, the input source of the image may be either a scanner or a digital camera, and can be altered as appropriate if only it can acquire image data expressed in multiple tones in picture elements arranged in a dot matrix.

Further, it is sufficient for the frequency distribution charting unit to be able to total the picture elements of the image data acquired by the image data acquisition unit as classified by tone and chart frequency distributions from which the tone trend of the image can be perceived. Therefore, the totaling of picture elements as classified by tone level may either cover all the picture elements of the entered image or only those appropriately sampled. Needless to mention, the totaling of samples alone would contribute to reduce the time required for computation. In this case, sampled images may be acquired at the aforementioned stage of using the image data acquisition unit.

It is sufficient for the background determination unit to be able to compute a statistical quantity of a reference area charted by the frequency distribution charting unit, and determine on the basis of this statistical quantity any background present in the image acquired by the image data acquisition unit. Therefore, the statistical quantity to be computed as described above may either be the relative frequencies in the reference area or the standard deviation of this reference area. Of course, the choice is not limited to these statistical values, but may be any of various other statistical values according to which the presence of any background can be determined, e.g. a mode, median or mean, or conditions according to which the presence of any background can be determined may be set by combining these statistical values.

Picture elements have as their data, if the entered image is in color, red (R), green (G) and blue (B) tones or, if it is monochrome, tones of different shades. The frequency distribution charting unit, if the image is in color, totals the RGB tones of picture elements as classified by tone level to chart frequency distributions or, if it is monochrome, totals the luminance tones of picture elements as classified by tone level to chart frequency distributions. Alternatively, it may as well compute luminance levels from RGB data for an RGB color image, and total the luminance tones as classified by tone level to chart frequency distributions.

Hereupon, as an example of this variation, the frequency distribution charting unit may compute the luminance levels of picture elements and total the luminance tones as classified by tone level to chart frequency distributions.

In this configuration, the frequency distribution charting unit, if the entered image is in color, computes the luminance levels of picture elements from the RGB data of the picture elements to acquire tones indicating relative shades. Or if the entered image is monochrome, it acquires tones indicating the relative shades of picture elements. Then it totals the luminance tones as classified by tone level to chart frequency distributions.

In this manner, it is made possible to total the tones of the picture elements of the entered image as classified by tone level to chart frequency distributions by a simple technique.

As an example of charting frequency distributions in a color image, the frequency distribution charting unit may as well separate the picture elements into element colors, and total the tones of the element colors as classified by tone level to chart frequency distributions for each element color.

Configured in this manner, the frequency distribution charting unit may separate the picture elements of the entered color image into element colors, i.e. separate the image data of the picture elements into element colors of RGB, and total the tones of the element colors as classified by tone level to chart frequency distributions.

In this manner, it is made possible to chart, with respect to a color image, frequency distributions appropriately representing the state of the image.

Here, the background determination unit determines, on the basis of the frequency distribution according to the luminance levels or the tones of element colors of picture elements constituting the image data charted by the above-described method, determines whether or not the image has a background. There are many different techniques available for determining the presence of this background. As a specific example of technique for determining the presence of a background by the aforementioned frequency distribution, according to a second aspect of the present invention, there is provided a variation of the image data background determining apparatus according to the first aspect of the invention, wherein the background determination unit computes the relative frequencies of the reference area and, if either each or the total of the computed relative frequencies is at or above a prescribed threshold, determines that there is an area constituting a background in the image.

According to the second aspect of the invention configured as described above, the background determination unit computes the relative frequencies of the reference area and, if each or the total of these computed relative frequencies are not below a prescribed threshold, determines that there is a background area in the image. Thus, if the number of picture elements in the area demarcated as a presumed background is not smaller by a threshold than that of all the picture elements, the unit determines that there is a background in the image. Of course the criterion of determination is not limited to whether the frequency is not below a prescribed threshold, but viewed the other way around, the determination can be made according to whether or not the relative frequencies of other parts than the demarcated area are at or above a threshold. Therefore, the criterion of determination is not limited to a threshold, but the determining method can be altered as appropriate as long as the presence of a background can be determined from relative frequencies.

Another example determining the presence or absence of a background on the basis of frequency distribution uses a configuration according to a third aspect of the present invention in which the background determination unit of the image data background determining apparatus according to either the first or the second aspect of the invention computes the relative frequency of each tone in the reference area, and determines the presence of an area constituting a background in the image if the total of tones having a prescribed or higher relative frequency is not smaller than a prescribed threshold.

The background determination unit according to the third aspect of the invention computes the relative frequency of each tone in the reference area and, if the total of the occurrences of tones having the prescribed or higher relative frequency is not less than the prescribed threshold, determines that there is a background area in the image.

More specifically, here is considered a case in which the reference area is between tones of 200 and 255, the prescribed relative frequency is 10% and the threshold is 10. First, the background determination unit computes the relative frequency of each of the 56 tone levels in this determination area, and then determines whether or not each relative frequency is 10% or above. If the relative frequency of each of the tones from 230 to tone 255 is found to surpass 10%, the total number of tone levels satisfying this condition will be 26. Then it is determined whether or not this total number of tones is at or above the threshold and, as it actually is in this case, it is determined that there is an area constituting a background in the image.

Another example determining the presence or absence of an area constituting a background on the basis of frequency distribution uses a configuration according to a fourth aspect of the present invention in which the background determination unit of the image data background determining apparatus according to the first aspect of the invention computes the standard deviation of the reference area and, if the standard deviation is not above a prescribed threshold, determines that there is an area constituting a background in the image.

In the configuration according to the fourth aspect of the invention, the background determination unit computes the standard deviation of the reference area and, if the standard deviation is not above the prescribed threshold, determines that there is an area constituting a background in the image.

That the standard deviation is not above a threshold means that the frequency distribution has a steep peak in the reference area. Since the background here represents the color of paper, it has similar color components to those of the paper. For this reason, the color components of the background are counted as having approximately the same tones in charting the frequency distribution. The frequency distribution near the tone level at which the background is counted then has a steep peak. Therefore, the standard deviation is computed, and it is made possible to determine the presence of a background by using the finding that this standard deviation is not above the threshold.

While the presence of an area constituting a background in an image is determined on the basis of relative frequencies or a standard deviation in the reference area, the determination may either rely on relative frequencies or a standard deviation alone, but may use either of them in combination with some other statistical value.

Another example determining the presence or absence of a background on the basis of frequency distribution uses a configuration according to a fifth aspect of the present invention in which the background determination unit of the image data background determining apparatus according to any one of the second through fourth aspects of the invention computes representative values of the reference area, and determines whether or not there is an area constituting a background in the image by combining the representative values.

In the configuration according to the fifth aspect of the invention, the background determination unit computes the representative values of the reference area, and determines whether or not there is an area constituting a background in the image by combining the representative values. The representative value here may be the mode of an area demarcated by a prescribed tone level, average or median, and can be altered as appropriate.

Since the tones of picture elements of noise components contained in the entered image are also counted in charting the frequency distributions here, the noise components may affect any computed statistical quantity. As a suitable technique where by the noise components counted into the frequency distribution, in the configuration according to the sixth aspect of the present invention, the background determination unit in the image data background determining apparatus according to any one of the first through fifth aspects of the invention has a configuration to apply, in computing statistical values in the reference area, smoothing to the frequency distributions.

In the configuration according to the sixth aspect of the invention, the background determination unit applies, in computing statistical values in the reference area, smoothing to the frequency distribution. Since this results in computation of the statistical values on the basis of frequency distributions cleared of noise components, the results of computation are unaffected by the noise components.

By applying prescribed image processing to picture elements constituting the determined background, it is made possible to provide contrast between the background and non-background parts of the image. In this connection, according to the seventh aspect of the present invention, the background determination unit in the image data background determining apparatus according to any one of the first through sixth aspects of the invention is provided with an image data retouching unit for so retouching the image data of picture elements, if the image has an area constituting a background, as to remove the background according to the area constituting the background.

In the configuration according to the seventh aspect of the invention, the image data retouching unit, if the image has an area constituting a background, applies retouching to the image data of picture elements according to the area constituting the background.

It is sufficient for the image data retouching unit here to retouch the image data of picture elements according to the area constituting the background, and the retouching may be executed, if the presence of such an area has been determined, according to the area being determined either fixed or variable.

One example of such retouch processing is background removal processing to eliminate the area constituting a background. This background removal processing means, where the entered image is a document, processing to vary the tone of the picture elements representing the blank area of the document paper to the highest tone. That is to say, when the document image is to be printed after this retouch processing, the picture elements whose tone was maximized as stated above are not printed, and the part of these picture elements will remain a blank part of the paper. Therefore, the picture elements in the part representing the blank paper area are apparently removed, making it possible to provide a print with clear contrast between the background and the characters.

As an example of specific technique for this image data retouching, according to an eighth aspect of the present invention, the image data retouching unit in the image data background determining apparatus according to the seven aspect of the invention, if the area constituting the background of the image is near a highlight, generates a correction curve having a parameter to maximize the tone of picture elements near the highlight, and corrects the tones of picture elements in the image data according to the correction curve.

In the configuration described above according to the eight aspect of the invention, the image data retouching unit, if the area constituting the background of the image is near a highlight, generates a correction curve having a parameter to maximize the tone of picture elements near the highlight, and corrects the tones of picture elements in the image data according to the correction curve.

On the other hand, if the entered image is a literal image, the other part of the image than the background consists of characters, or if it is a photographic image, the non-background part consists of a photograph. If an image involving many colors, such as a color photograph, is subjected to image data correction based on the same correction curve as that for a monochrome image consisting of only black, such as characters, much of the tones in the photographic part may be lost. In view of this problem, according to the ninth aspect of the present invention, the background determination unit in the image data background determining apparatus according to the invention determines the presence or absence of an object in the image in accordance with a prescribed technique and, if there is found an object, the image data retouching unit alters the parameter of the correction curve.

In the above-described configuration according to the ninth aspect of the invention, the background determination unit determines the presence or absence of an object in the image in accordance with a prescribed technique and, if there is found an object, the image data retouching unit alters the parameter of the correction curve. Thus, if there is an object corresponding to a photographic part, the width of clamping to the highest tone is narrowed or, if the image consists of characters or the like, the width of clamping to the highest tone is expanded. This makes it possible both to prevent loss of tones in a photograph part, if any, of a retouched image and to ensure sufficient contrast in a retouched image consisting of binary elements, such as characters.

According to the 10th aspect of the present invention, an image data background determining apparatus according to any one of the first through ninth aspects of the invention has a configuration having an image data designating unit for designating the image data acquired by the image data acquisition unit to be either color image data or monochrome image data and a tone setting unit for setting a tone to demarcate the reference area in response to the designation by the image data designating unit.

In the above-described configuration according to the 10th aspect of the invention, the vicinity of the high tones of the picture elements constituting the image data is set to be the background of the image correspondingly to the state of the image data.

More specifically, once the image data acquisition unit has acquired image data expressing an image in multiple tones in picture elements arranged in a dot matrix, designates with an image data designating unit these image data acquired by the image data acquisition unit to be either color image data or monochrome image data, and a tone setting unit sets a tone to demarcate the reference area in response to the designation by the image data designating unit.

Thus, in setting as the background the area near the high tone of the entered image, the setting is made variable according to whether the image data are color image data or monochrome image data.

Here, it is sufficient for the image data designating unit to be able to designate the acquired image data to be color image data or monochrome image data, and the designation may be either based on the tone data of the picture elements of the image data or as opted by the user. It is adequate for the tone setting unit to be able to set a tone for demarcating the reference area according to the designated color image data or monochrome image data, and either the setting may be based on a prescribed fixed value or the tone may be varied appropriate to a given state of the image.

Either the color image data and the monochrome image data may be distinguished between what consist of RGB data and what consist of black-and-white monochrome data, or the image as a whole may be distinguished between color image data and monochrome image data.

The image data designating unit identifies the trend of acquired image data, i.e. color components and the like constituting picture elements, on the basis of data the picture elements constituting the image are provided with. As one example of specific technique for identifying the trend of image data in such a case, the image data designating unit can have a configuration to compute the luminance levels of the picture elements and total the luminance tone levels as classified by tone level to chart frequency distributions.

In this configuration, the image data designating unit receives the input of RGB data constituting the picture elements of image data acquired by the image data acquisition unit, and computes the luminance from these RGB data in accordance with a prescribed technique. Having computed luminance levels of the picture elements, it totals them as classified by tone level, and charts frequency distributions with luminance densities as tone levels. This enables the image data designating unit to identify relative densities of image data.

In another example of specific technique for the image data designating unit to identify the trend of image data, the image data designating unit can also have a configuration to separate the picture elements into element colors, total the tones of the element colors by tone level, and chart a frequency distribution for each element color.

In this configuration, the image data designating unit separates the picture elements of the image data acquired by the image data acquisition unit into RGB data which are element colors. Then it totals frequencies of each element color, and charts frequency distributions with densities as tone levels. This enables the image data designating unit to know the relative shades of image data with respect to each element color.

In this way, it is made possible to identify the trend of a given image as to whether it is in color or monochrome according to tone information on the element colors that form the picture elements constituting the image data. It is satisfactory for the image data designating unit to be able, while identifying the trend of the image data in accordance with the aforementioned technique, to designate whether the image consists of color image data or of monochrome image data. Then the image data designating unit can have a configuration to designate, on the basis of the aforementioned frequency distributions, whether the image data are monochrome image data or color image data.

In this configuration, the image data designating unit designates whether the image data are monochrome image data or color image data on the basis of the frequency distributions.

Thus, if the frequency distributions according to the luminance density reveal high proportions of low density tones, near-black relative frequencies and near-white relative frequencies, the entered image is designated as consisting of monochrome image data, and otherwise they are designated as consisting of color image data. Or if frequency distributions according to the density of each element color reveal high proportions of relative frequencies near the high tone of RGB data and relative frequencies near the low tone of same, the entered image is designated as consisting of monochrome image data, and otherwise they are designated as consisting of color image data.

In this way, it is made possible to designate the image data to be monochrome image data or color image data according to the identified trend of the image.

The available technique for image data designation is not limited to what is based on identification of the trend of image data by the image data designating unit, but the user may look at the state of the image and designate in his or her judgment the image data to be color image data or monochrome image data.

Then, according to the 11th aspect of the present invention, the image data designating unit in the image data background determining apparatus according to the 10th aspect of the invention has a configuration for the user to designate the image data to be monochrome image data or color image data by his or her own choice.

The image data designating unit having the above-described configuration according to the 11th aspect of the invention designates the image data to be monochrome image data or color image data by the user's own choice instead of relying on the trend of the image data acquired by the image data acquisition unit or on the trend identified from frequency distribution according to the luminance level of the image data or to the densities of element colors. This enables the user, if he or she desired to treat the entered image as color image data, to designate them as color image data or, if the user opts to treat them as monochrome image data, to designate them as monochrome image data, resulting in a user-friendly environment.

As the image data designating unit, while identifying the trend of image data, designates whether the image consists of color image data or monochrome image data, the tone setting unit sets a tone to demarcate the reference area for color image data or monochrome image data according to the designation.

As one example of specific technique for such setting, the tone setting unit can have a configuration to be provided with a tone setting for monochrome image data and another tone setting for color image data as fixed values, and to switch between the different settings according to designation by the image data designating unit.

In this configuration, the tone setting unit is provided with a tone setting for monochrome image data and another tone setting for color image data as fixed values, and switches between the different settings according to designation by the image data designating unit.

In this way, it is made possible to set a tone matching color image data or monochrome image data by a simple technique.

As another specific example of setting of a tone to demarcate the reference area by the tone setting unit, according to the 12th aspect of the present invention, the tone setting unit in the image data background determining apparatus according to either the 10th or the 11th aspect of the invention has a configuration to set the tone variably according to the state of the frequency distributions.

The tone setting unit having the above-described configuration according to the 12th aspect of the invention sets the tone to demarcate the reference area variably according to the state of the frequency distributions charted for different luminance levels and element colors. This makes it possible, if high contrast between black and white in an image designated as consisting of monochrome image data for instance is desired, to set the tone so as to expand the area to be demarcated as a white background or, if the reverse is desired, to set the tone so as to compress the area to be demarcated as a white background.

As described above, the setting by the tone setting unit may be either a fixed or variable value depending on whether the imaged acquired by the image data acquisition unit consists of color image data or monochrome image data. As a specific example of setting a fixed or variable value in such a case, according to the 13th aspect of the present invention, the tone setting unit in the image data background determining apparatus according to the 12th aspect of the invention has a configuration to set, where the designation by the image data designating unit is for color image data, the reference area narrower toward the high tone or, where it is for monochrome image data, the reference area wider than for color image data from the high tone to the low tone.

The tone setting unit having the above-described configuration according to the 13th aspect of the invention switches the tone setting according to the designation by the image data designating unit.

Thus, where the designation from the image data designating unit is for color image data, the demarcating tone is set for a narrower reference area compressed toward the high tone so that RGB data constituting photographic and/or color graphic factors in the picture elements may not be judged as components of the background or, where the designation is for monochrome image data, the tone is set for a broader reference area expanded toward both the high tone and the low tone than for color image data to distinguish the white background clearly from black characters for instance.

The image data acquired by the image data acquisition unit undergoes this designation by image data designating unit as to whether the image which is the origin of these image data consists of color image data or monochrome image data. Then, the tone setting unit sets a tone to demarcate the area constituting the background of the image, and the background area determination unit determines whether or not the picture elements of the image data constitute the background. By retouching the acquired image data on the basis of this determination, it is made possible to provide clear contrast between the background and other parts, which would result in an attractive-looking image.

Therefore, according to the 14th aspect of the present invention, the image data background determining apparatus according to the 13th aspect of the invention has a configuration comprising a the background area determination unit to generate a retouching curve have as its parameter the tone designated by the tone designating unit and an image data retouching unit to retouch the picture elements of the image data acquired by the image data acquisition unit according to the retouching curve.

In the above-described configuration according to the 14th aspect of the invention, the image data retouching unit first generates a retouching curve having as its parameter the tone designated by the tone designating unit, and then retouches the picture elements of the image data acquired by the image data acquisition unit according to the retouching curve. Where this retouching curve is a linear function having a prescribed inclination, the RGB data of the entered picture elements are substituted into the function to acquired the RGB data of the retouched picture elements, and an output image is generated from these picture elements.

As a specific example of this diverse retouching to be carried out by this image data retouching unit, the image data retouching unit can have a configuration to retouch to the highest tone the picture elements that have been determined to constitute a background area according to the retouching curve.

In this configuration, the image data retouching unit retouches to the highest tone the picture elements that have been determined to constitute a background area according to the retouching curve.

Where the retouching curve according to which the data constituting the picture elements of the entered image data as described above are converted into output image data is a linear function, the entered image data whose tone is near the high tone, i.e. in the tone range from 200 to 255, are clamped to a tone level of 255 when they are supplied as output.

Thus, where the image data are monochrome and the background is determined to be white, printing based on image data retouched in this manner will result in an unprinted background, because it is in the highest tone. Therefore, where white paper is used, as the background part will remain as blank paper, the non-background part can be made contrasty against the background.

In this manner, as an example of image data retouching, it is made possible to acquire contrasty, attractively looking output image data by clamping to the highest tone the picture elements of acquired image data having a tone level close to the high tone.

It can be readily understood by those skilled in the art that such a technique to determine the presence of an area constituting a background in an image according to frequency distributions of the image data need not be confined to physical apparatuses but may function as methods as well. In this connection, according to the 15th aspect of the present invention, there is provided an image data background determining method for determining an area constituting a background in an image according to frequency distributions of the image data, provided with an image data acquisition step to acquire image data expressing in multiple tones an image in picture elements in a dot matrix arrangement; a frequency distribution charting step to chart frequency distributions by totaling the picture elements of the image data acquired by the image data acquisition unit as classified by tone level; and a background determination step to compute a statistical quantity representing the characteristic of a reference area demarcated by dividing the frequency distributions according to a prescribed tone level and, if that statistical quantity is a sufficient value to indicate the presence of a background, determine that the image has an area constituting a background.

Thus, there is no doubt that the invention can be effective not only for a physical medium but for a method therefor. It goes without saying that the second through 14th aspects of the invention applies to this image data background determining method exactly as they do to the physical apparatuses so far described.

Incidentally, any such image data background determining apparatus may either function independently or be used as incorporated into some other hardware. Thus the idea underlying the invention is not restricted to what is described herein, but covers various other modes of realization. Therefore, it can take the form of software or hardware, and the form can be varied as appropriate.

As an example of materializing the idea underlying the invention, if it is in the form of software for an image data background determining apparatus, the idea obviously is present on the recording medium recording there on such software.

For example, according to the 16th aspect of the present invention, there is provided a medium recording thereon an image data background determination control program for determining an area constituting a background in an image according to frequency distributions of the image data, provided with an image data acquisition step to acquire image data expressing in multiple tones an image in picture elements in a dot matrix arrangement; a frequency distribution charting step to chart frequency distributions by totaling the picture elements of the image data acquired by the image data acquisition unit as classified by tone level; and a background determination step to compute a statistical quantity representing the characteristic of a reference area demarcated by dividing the frequency distributions according to a prescribed tone level and, if that statistical quantity is a sufficient value to indicate the presence of a background, determine that the image has an area constituting a background. It goes without saying that the second through 14th aspects of the invention applies to this medium recording thereon the image data background determination control program exactly as they do to the physical apparatuses so far described.

Of course, such a recording medium may be a magnetic recording medium or an opto-magnetic recording medium, and exactly the same idea applies to any recording medium that may be developed in the future. Exactly the same is true of copying stages for primary copies, secondary copies and so forth with no room for doubt. There is nothing different about the use of the invention on an transmission medium over which the program is transmitted utilizing a communication line, though the medium itself is different.

Furthermore, the realization of the invention partly in software and partly in hardware involves nothing different in the underlying idea, which may as well be stored in part on a recording medium to be appropriately read as required.

Where the invention is to be realized in software, the configuration may utilize hardware or an operating system, or the invention can be realized separately from them. For instance, processing to input image data for interpolation, can be accomplished by either calling a prescribed function in an operation system or by inputting from hardware without calling such a function. Even if it is to be realized in practice with the intervention of an operating system, in the process of distribution of the program recorded on a medium, it can be understood that the invention can be implemented by this program alone.

Or where the invention is to be implemented with software, not only is the invention realized as the medium on which the program is recorded, but also is the invention as the program itself, which, too, is included in the invention.

BRIEF DESCRIPTION OF THE DRAWINGS

FIGS. 18A–18B illustrate the configurations of picture elements before and after the execution of image data retouching applied to the image data.

DETAILED DESCRIPTION OF THE PREFERRED EMBODIMENTS

Preferred embodiments of the present invention will now be described below with reference to the accompanying drawings.

Figure 1:
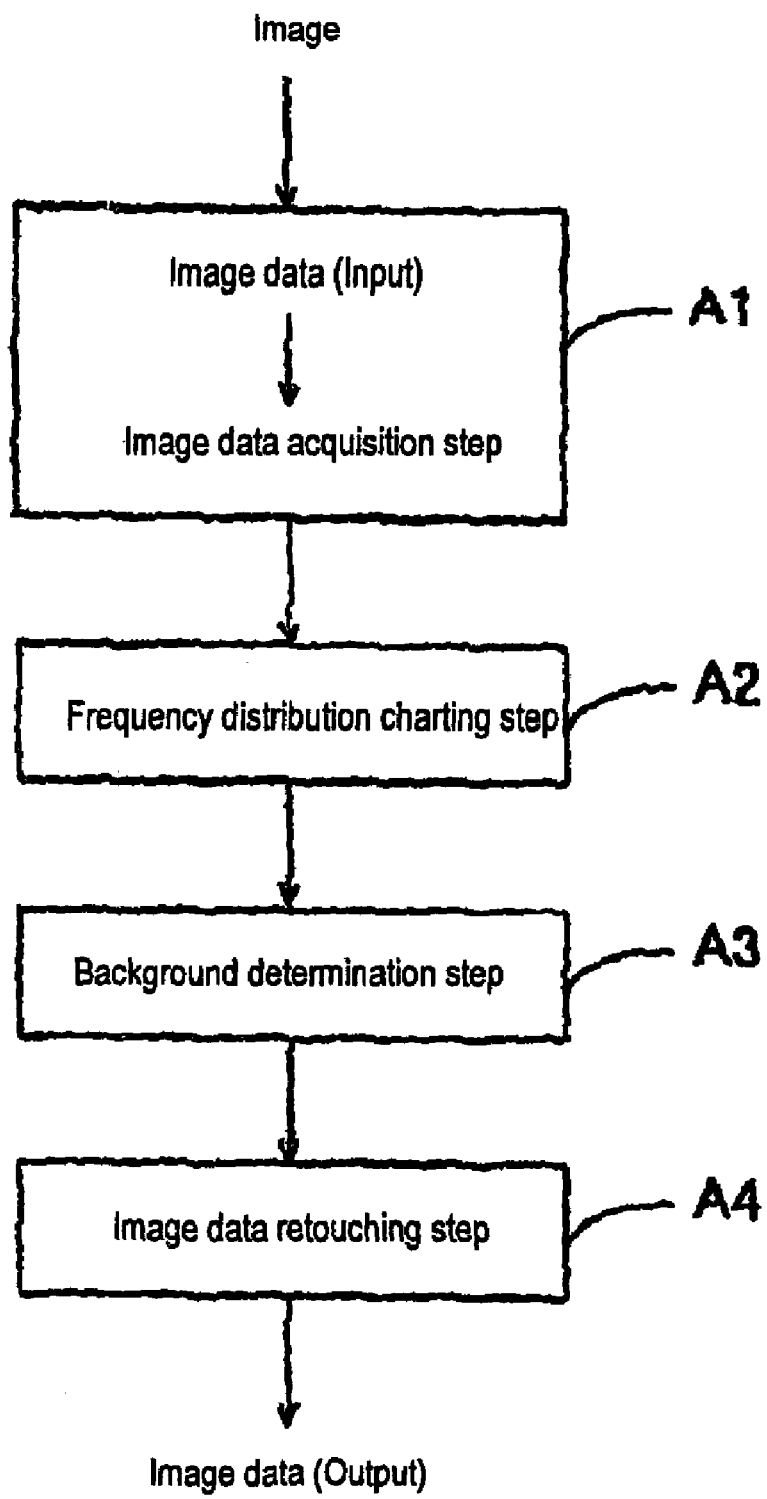
FIG. 1 is a schematic diagram illustrating an image data background determining method in a preferred embodiment of the present invention.

FIG. 1 is a claim-matched diagram illustrating an image data background determining method in one preferred embodiment of the invention.

In FIG. 1, this image data background determining method generally determines the presence of an area constituting a background in an image according to frequency distribution in the image data constituting the image.

More specifically, at an image data acquisition step A1, image data expressing the image to be subjected to background determination in multiples tones in picture elements arranged in a dot matrix are acquired. Next, at a frequency distribution charting step A2, the picture elements of the image data acquired at the image data acquisition step A1 are totaled as classified by tone level to chart frequency distribution. Then at a background determination step A3, a statistical quantity representing the characteristic of a reference area demarcating the frequency distribution by a prescribed tone level is computed and, if the statistical quantity shows a sufficient value to indicate the presence of a background, it is determined that an area constituting a background is presented in the image.

The background determination step A3 here is followed by an image data retouching step A4 at which, if there is an area constituting a background in the vicinity of the high tone in the image, the image data of picture elements are retouched according to the area constituting the background. At this image data retouching step A4, a correction curve provided with a parameter to maximize the tones in the vicinity of the high tone, i.e. the tones of picture elements forming substantial white, is generated, and the tones of the picture elements acquired at the image data acquisition step are corrected according to the correction curve.

Figure 2:
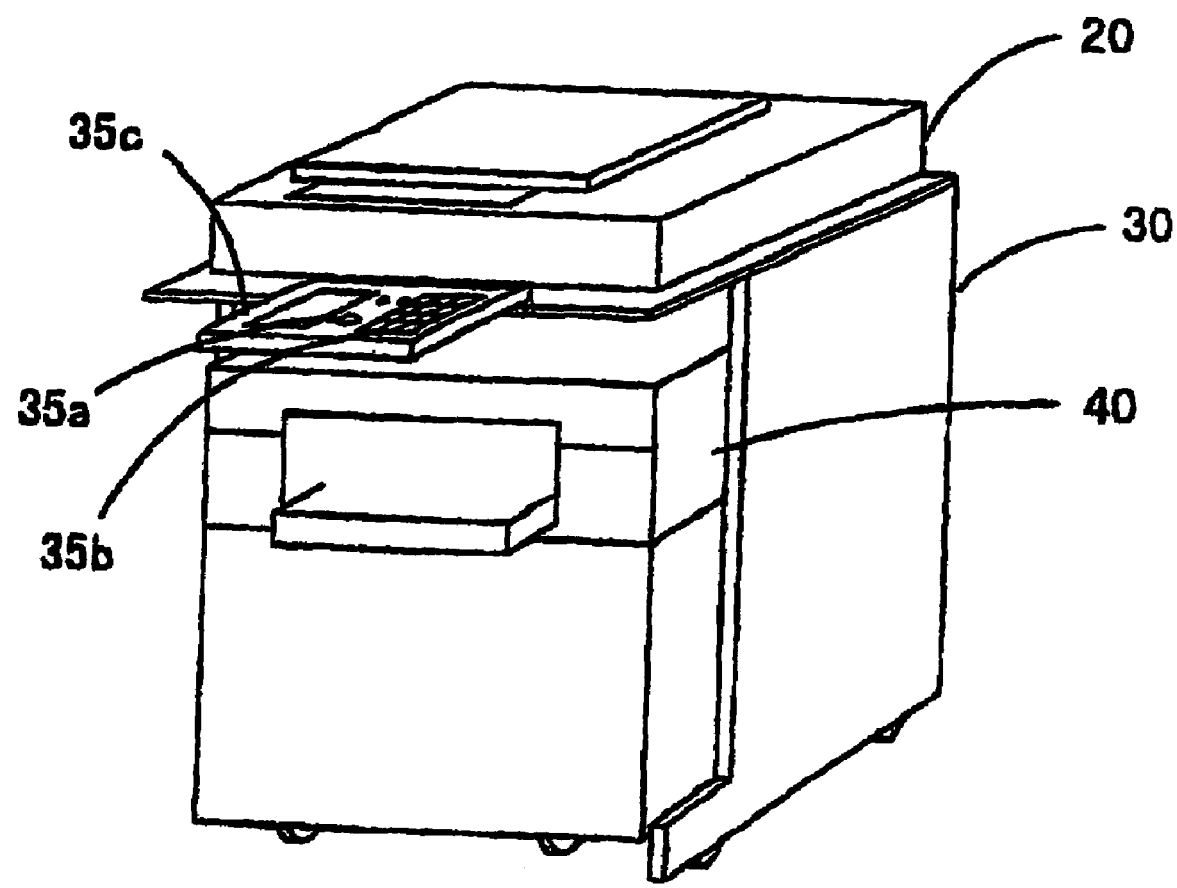
FIG. 2 schematically illustrates the appearance of a color copying apparatus to which this image data background determining method is applied for its materialization.

Next an external perspective view of a color copying apparatus to which the invention is applied to configure an image data background determining apparatus to materialize this image data background determining method illustrated in FIG. 2.

This color copying apparatus 10 is configured of a color scanner 20, a copy server 30 and a color printer 40. As the color scanner 20 scans an image under the control of the copy server 30, image data read in by the scanning are subjected to image processing by the copy server 30 generates print data, on the basis of which the color printer 40 carries out printing.

Figure 3:
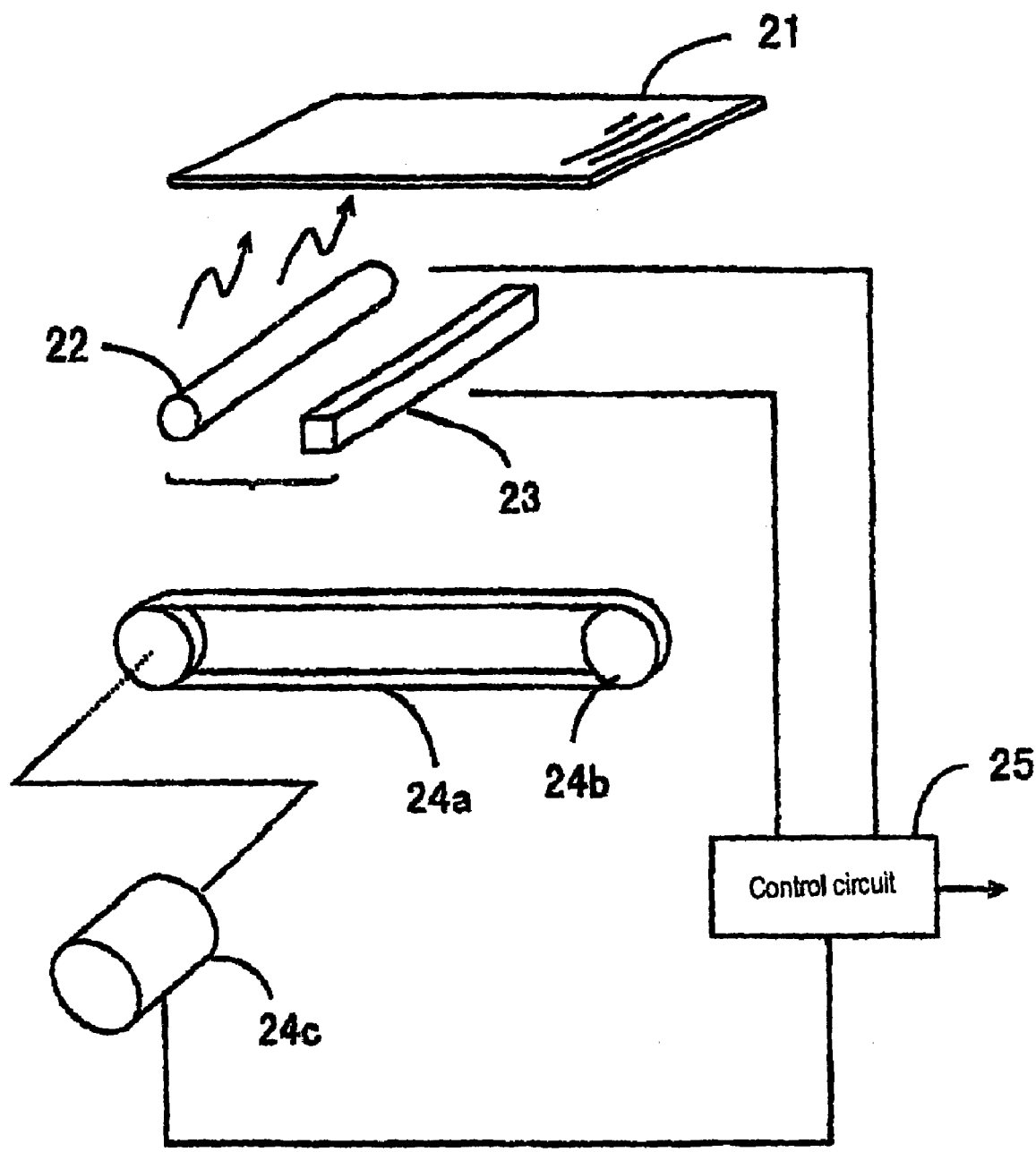
FIG. 3 schematically illustrates the configuration of the scanner of this color copying apparatus.

FIG. 3 schematically illustrates the configuration of the color scanner 20, one of a flat head type in this case.

In FIG. 3, underneath a transparent board 21 for mounting the object of scanning are supported an illuminating lamp 22 and a line sensor 23 in way they can be slid reciprocatively, and a drive belt 24a, a pulley 24b and a drive motor 24c for driving them are also arranged and connected to a control circuit 25. When an image is to be read in, upon lighting of the illuminating lamp 22 in accordance with a control signal from the control circuit 25, the lamp illuminates the object of scanning through the transparent board 21, so that a reflected light from the object of scanning irradiates the line sensor 23 via the transparent board 21.

In the line sensor 23 here, an RGB filter and usually three rows of CCD elements, each row matching one or another of the three primary colors of light. These three rows of CCD elements read in one row of color arrangement of the object of scanning in the horizontal direction, and supply them as image data. On the other hand, the control circuit 25 moves together the illuminating lamp 22 and the line sensor 24 in the vertical direction of the object of scanning by driving the drive motor 24c, and acquires and supplies image data from the line sensor 23 every time they are moved by an infinitesimal distance. This causes two-dimensional image data to be generated externally by feeding the object of scanning in the vertical direction while scanning it in the horizontal direction.

Figure 4:
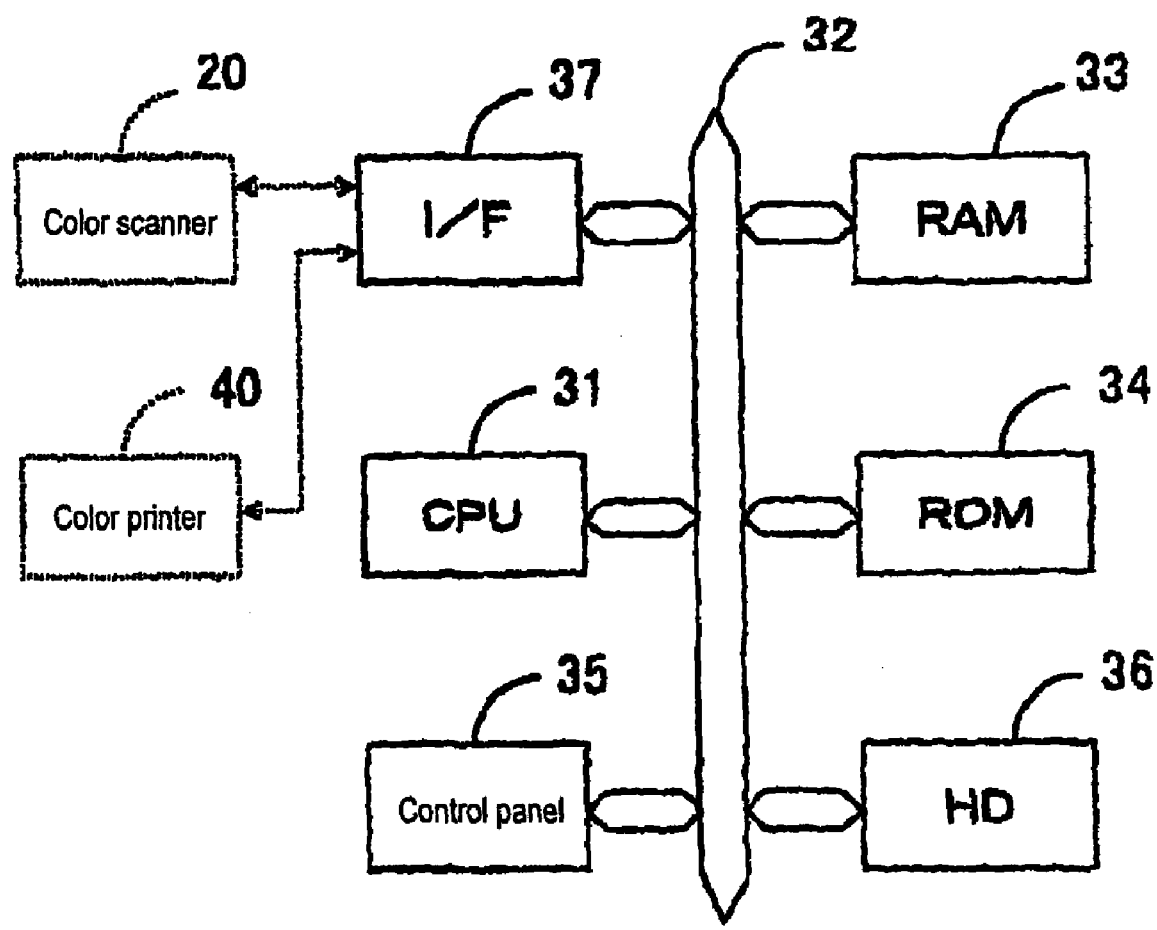
FIG. 4 is a schematic block diagram schematically illustrating the configuration of the copy server of this color copying apparatus.
Figure 5:
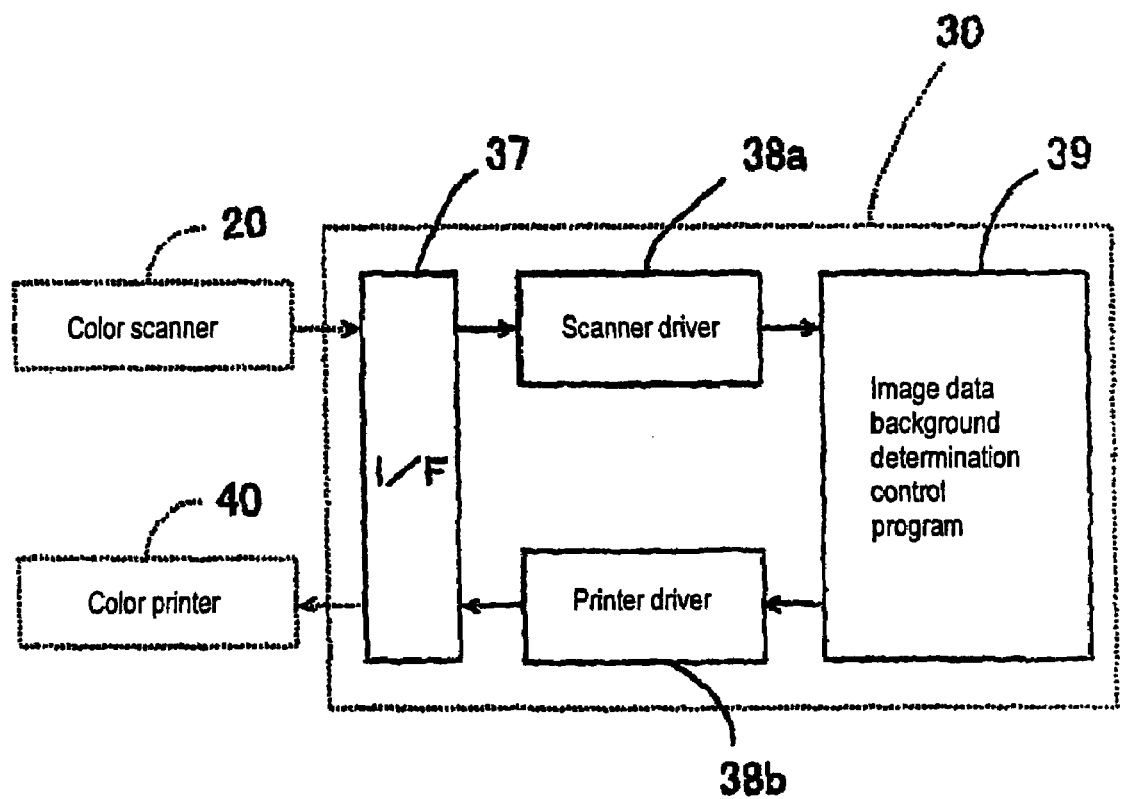
FIG. 5 is a schematic block diagram illustrating the configuration of the copy server.

FIG. 4 and FIG. 5 illustrates the copy server 30 in a schematic block diagram. The copy server 30 is substantially equivalent to a computer, and has a configuration in which a RAM 33, a ROM 34, a control panel 35, a hard disk 36 and an I/F 37 are connected to a bus 32 of a CPU 31.

Herein, the color scanner 20 and the color printer 40 are connected via the I/F 37. In the ROM 34 are written a basic computation program and conversion table, and the CPU 31, while using RAM 33 as its work area, executes the computation program and references the conversion table as required. In this embodiment, the I/F37, though not specified, may be any interface that can connect the color scanner 20 and the color printer 40 to the copy server 30, either via an LPT port or via a USB port or SCSI.

The hard disk 36 is provided with a scanner driver 38a for driving the color scanner 20 and a printer driver 38b for driving the printer 4, and the scanner driver 38a can input/output image data to and from the color scanner 20, and the printer driver 38b, to and from the color printer 40.

The hard disk 36, sometimes used as a buffer for temporarily storing these image data, stores an image data background determination control program 39 for reading image data entered by the scanner driver 38a, detecting an area constituting a background contained in the image data, carrying out image data retouching matching this detected background area, and supplying the image data having gone through this image data retouching to the printer driver 38b to cause the color printer 40 to execute printing.

In addition, the control panel 35 is equipped with a liquid crystal indicator 35c for confirming operational information besides a scan start button 35a and various operating buttons including a ten-key pad 35b for entering the number of sheets to be printed and setting retouch items for images, and the CPU 31 can monitor via the bus 32 how the control panel 35 is being operated.

Figure 6:
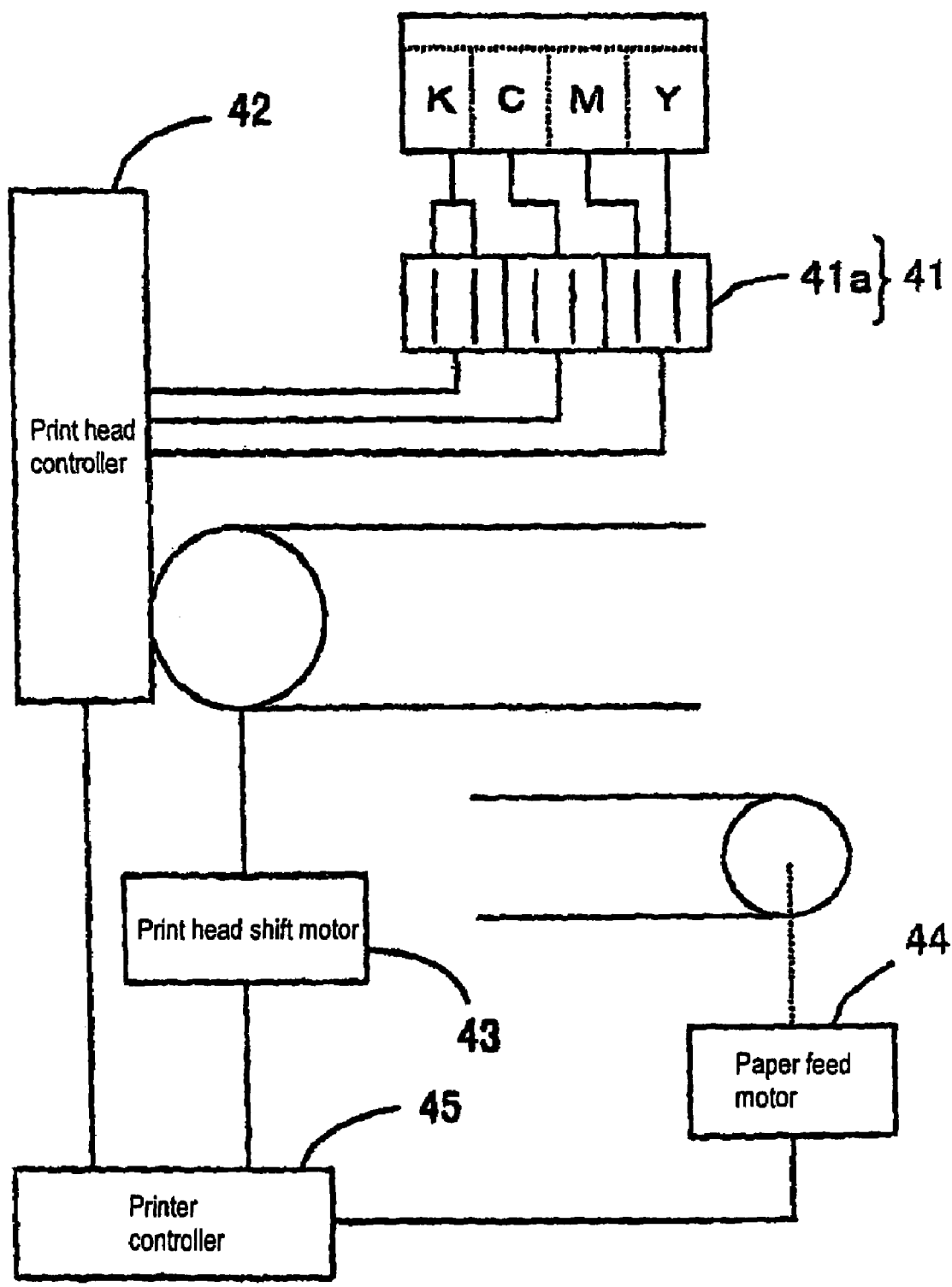
FIG. 6 is a schematic diagram illustrating the configuration of the color printer of this color copying apparatus.
Figure 7:
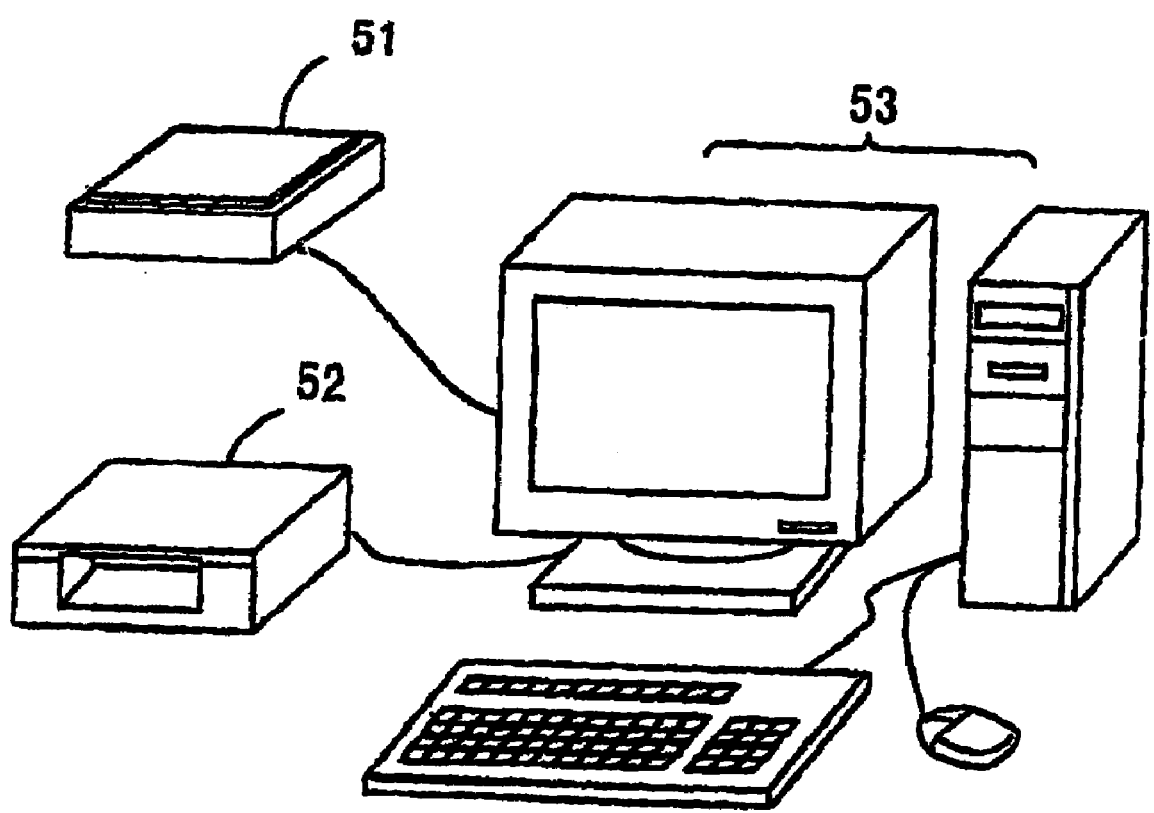
FIG. 7 schematically illustrates the appearance of a computer system which is a variation of this color copying apparatus.

FIG. 6 schematically illustrates the configuration of the color printer 40, which uses an ink jet system whereby printing is carried out by discharging color inks onto recording paper in a dot matrix arrangement. In more detail, the ink jet system is composed of a print head 41 consisting of three print head units 41a, a print head controller 42 for controlling this print head 41; a print head shift motor 43 for shirting the print head 41 in the column direction, a paper feed motor 44 for feeding the printing paper in the row direction, and a printer controller 45 serving as an interface for these print head controller 42, print head shift motor 43 and paper feed motor 44 with external devices.

This color printer 40 uses printing inks of four colors, and in each of its print head units 41a are formed two mutually independent rows of print nozzles. The color inks to be supplied can be changed by print nozzle row, and in this particular case both rows of the print head unit 41a on the left side in the drawing are supplied with black ink (K) while the left and right rows of the print head unit 41a on the right side in the drawing are supplied with magenta-colored ink (M) and yellow ink (Y), respectively, and the left row of the print head unit 41a at the center in the drawing is supplied with cyan-colored ink (C) with the right row unused.

Incidentally, although this embodiment uses inks of four different colors, it is also possible to utilize the two rows of print nozzles on the three print head units 41a to the maximum and use inks of six colors. In this case, the six inks would consist of dark and light cyan and magenta inks plus yellow and black inks.

Although in this embodiment this image data background determining apparatus is applied as a dedicated color copying apparatus 10 formed in an integrated configuration having such a copy server 30 as its core, it goes without saying that a personal computer (PC) 53 provided with a color scanner 51 and a color printer 52 as illustrated in FIG. 6 can similarly constitute a color copying system.

Figure 8:
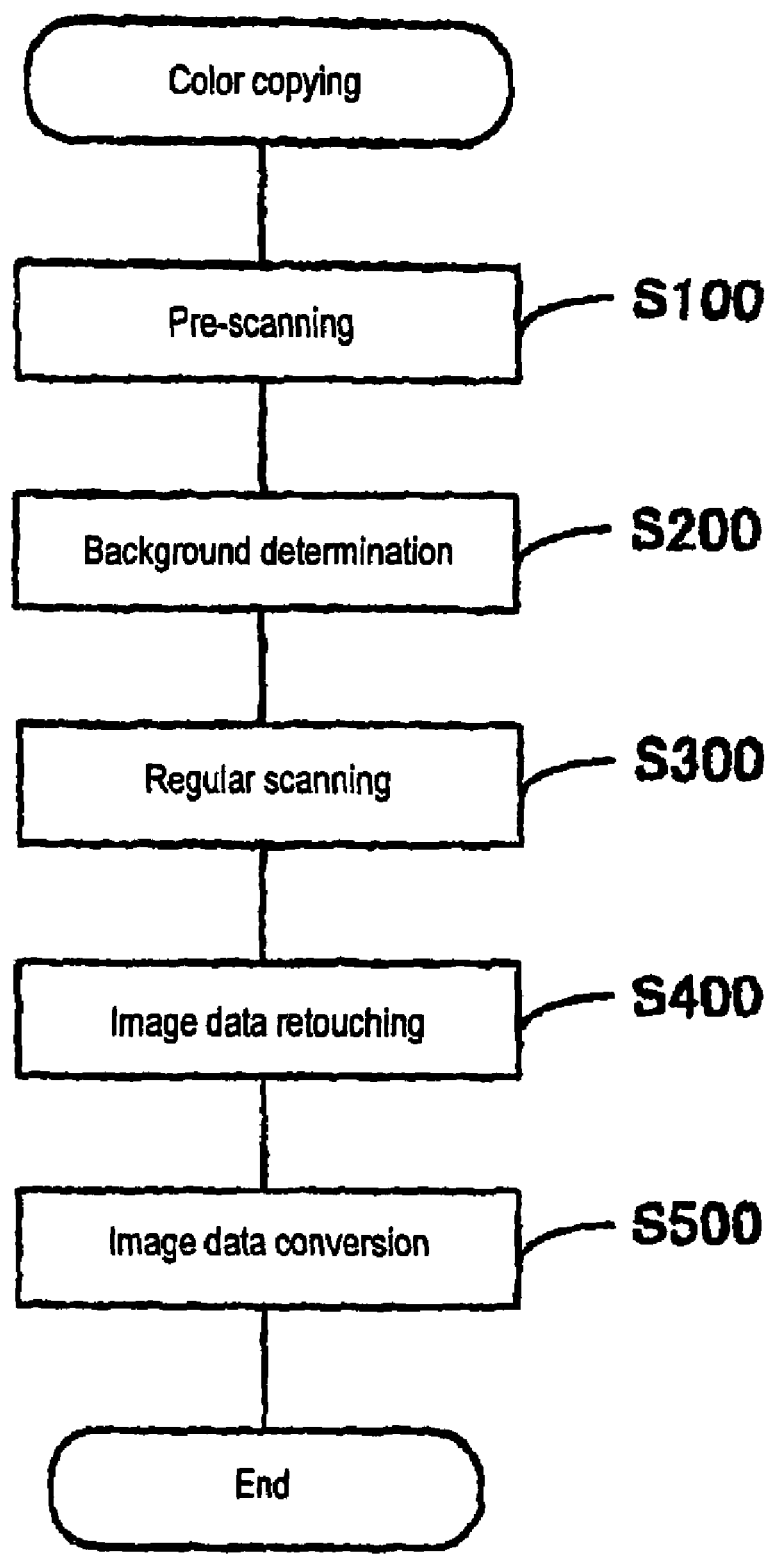
FIG. 8 is a flowchart schematically illustrating how the copy server processes color copying.

FIG. 8 schematically shows in a flowchart how image data background determination according to the present invention, out of the color copying process executed by the copy server 30, is carried out.

Referring to FIG. 8, the operator of this color copying apparatus 10 mounts on the flat head 21 of the color scanner 20 a document to be scanned, and presses the scan start button 35a on the control panel 35. This causes the color scanner 20 to start scanning. First, in order to generate image data consisting of low-resolution picture elements on the whole image of the flat head 21 including the image of the document, pre-scanning is executed (step S100). According to the image data so generated, it is determined by a prescribed technique whether or not there is an area constituting a background in the image data of the document image (step S200).

Next, the color scanner 20, in order to execute prescribed image data retouching to be described below on the basis of the result of determination, operates the flat head 21 and starts regular scanning of high resolution to acquire detailed image data of the document image (step S300). Then the image data read in by this regular scanning are subjected to image data retouching according to the correction curve based on the prescribed statistical value of the area determined to be a background at step S200 (step S400). Upon completion of this image data retouching, image data conversion to generate print data to be supplied to the color printer 40 is executed (step S500). This results in execution of image data retouching which takes into account the background area of the document image regarding the image data on the document image entered at step S100 described above.

Although this embodiment uses a configuration in which pre-scanning is executed at step S100, an area constituting a background in the image is determined at step S200 on the basis of sampled low-resolution image data, and the detailed image data acquired by regular scanning at step S300 is subjected to image data retouching at step S400, of course it may as well adopt a configuration in which pre-scanning at step S100 is dispensed with, and an area constituting a background of the image is determined according to the image data acquired by regular scanning, followed by the execution of image data retouching.

Now, processing at each of steps S100 through S500 will be described more specifically with reference to flowchart s of FIGS. 9 through 17.

Figure 9:
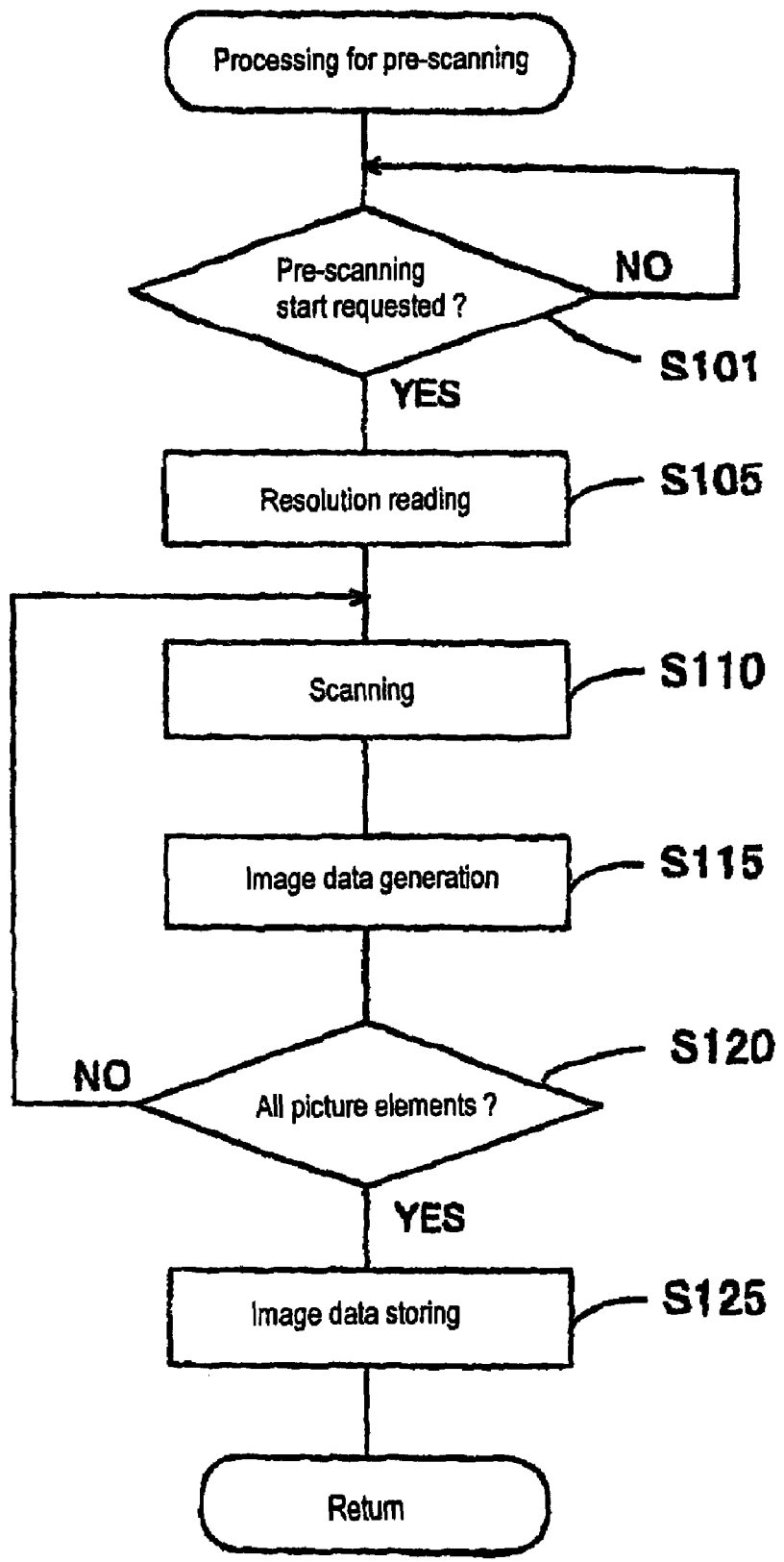
FIG. 9 is a flowchart schematically illustrating how the copy server processes pre-scanning.

The flowchart of FIG. 9 shows how pre-scanning at step S100 is carried out.

As stated above, when the operator of this color copying apparatus 10 mounts on the flat head 21 of the color scanner 20 a document to be scanned, and presses the scan start button 35a, an image read instruction is delivered to the color scanner 20 via the I/F 37 and scanning is started (step S101). Then, the operator reads out the resolution of pre-scanning set by way of the ten-key pad 35b (step S105). Hereupon, the control circuit 25 of the color scanner 20 turns on the illuminating lamp 22 and starts scanning the image by giving a drive instruction to the drive motor 24c to slide the illuminating lamp 22 and the line sensor 23 (step S110). Every time they are moved by a prescribed distance, the control circuit 25 generates image data on picture elements into which the image read by the line sensor 23 are divided according to the level of resolution (step S115), and transmits them to the copy server 30. The copy server 30 receives these image data via the I/F 37 and spools them on the hard disk 36. When it is judged here that the picture elements resulting from the division have wholly gone through scanning (step S120), the spooled image data are stored onto the hard disk 36 (step S125).

Thus this pre-scanning by which image data are stored as they are acquired by low-resolution scanning constitutes image data acquisition step A1.

Whereas this embodiment uses pre-scanning in a prescribed low resolution, the specific resolution may be 50 dPi or 60 dPi. The resolution may be either stored in advance on a RAM 34, ROM 35 or hard disk 36, or set as appropriate by a prescribed method from a keyboard or a mouse provided on the control panel 35 or the PC 53 as described above.

Figure 10:
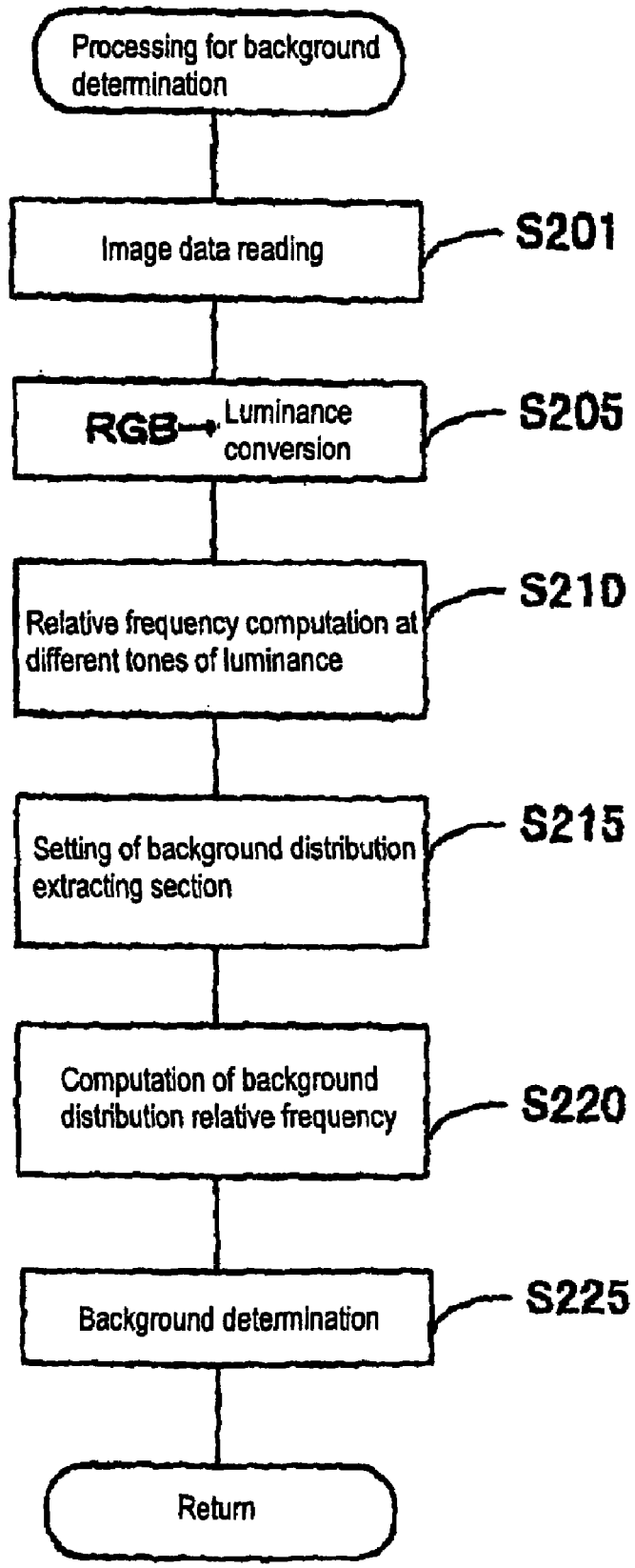
FIG. 10 is a flowchart schematically illustrating how the copy server processes background determination.

From these image data, frequency distributions of picture elements contained in the image data are charted in the sequence of the flowchart of background determination at step S200 shown in FIG. 10, and the presence of a background area in the image is determined from this frequency distribution.

Referring to FIG. 10, first the image data stored onto the hard disk 36 at step S125 are read out (step S201). Hereupon, the color components of red (R), green (G) and blue (B) data constituting the colors of the picture elements of the image data are extracted. As each color component has a density of some level in the tone range of 0 to 255, a luminance level Y is computed for each picture element by substituting the tone level of somewhere between 0 and 255 of the RGB data into Equation (1) below (step S205)

$$Y = 0.30R + 0.59G + 0.11B \tag{1}$$

Figure 11:
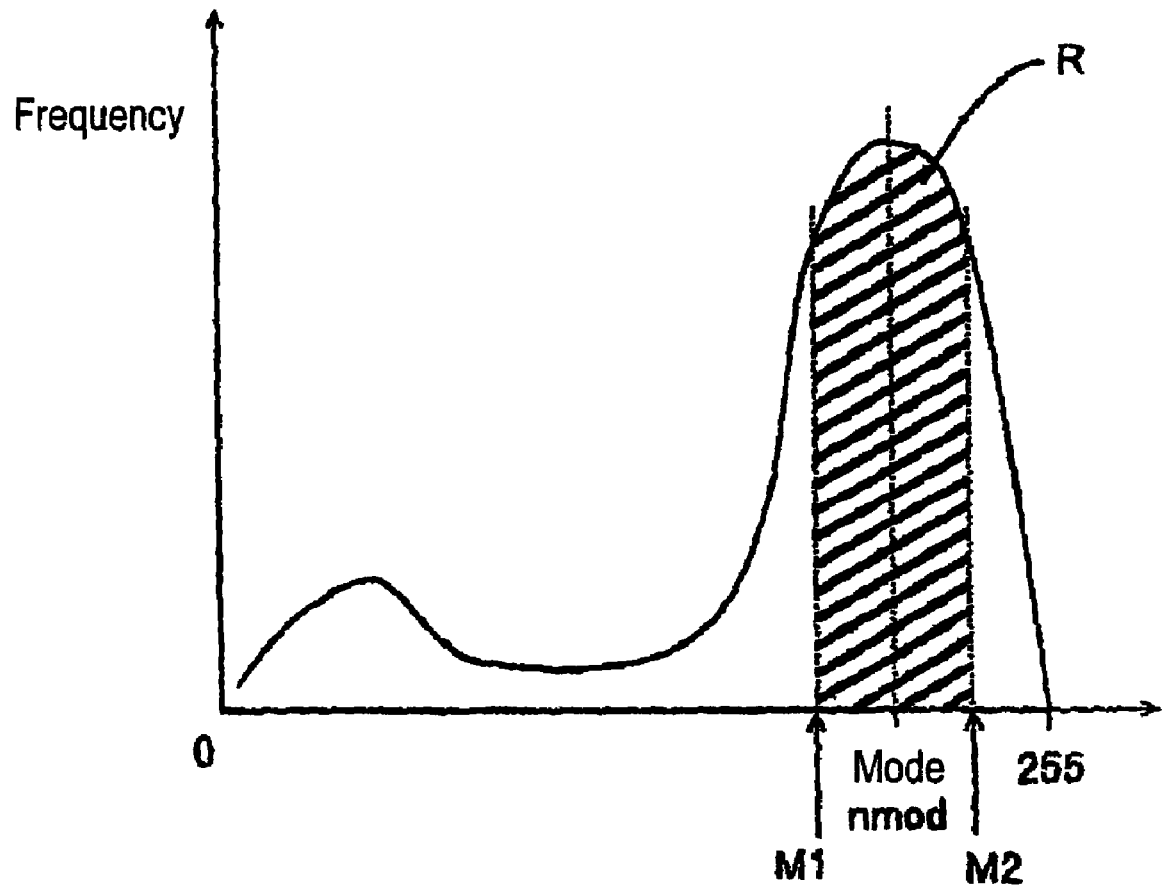
FIG. 11 illustrates a frequency distribution of image data charted by the background determination.

After computing a luminance level for every picture element of the image data according to Equation (1), picture elements are counted for every luminance tone level between 0 through 255 to chart frequency distributions as shown in FIG. 11.

Then, a relative frequency at each tone level between 0 and 255 is computed. The frequency I of each tone is represented by Equation (2).

$$I = f(n) n = 0 \sim 255 \tag{2}$$

Therefore, the relative frequency at each tone level can be computed in accordance with Equation (3) below (step S210).

$$r(n) = \frac{f(n)}{\sum_{k=0}^{255} f(k)} n = 0 - 255 \tag{3}$$

Then, the section from which a background distribution which is the area constituting a background of the image in this frequency distribution is set (step S215).

In setting the section of this background distribution, first the maximum frequency in the frequency distribution is determined in accordance with Equation (4) below.

$$fmod = \max[f(n)] n = 0 \sim 255 \tag{4}$$

The tone corresponding to this maximum frequency fmod is supposed to be the mode nmod. This mode nmod is the tone constituting the peak part of the frequency distribution as shown in FIG. 11. By utilizing this mode nmod, tones M1 and M2 to determine the section from which to extract the background distribution is computed in accordance with Equation (5) below.

$$\begin{aligned} M1 &= n\text{mod} - N & N &<= n\text{mod} \\ &= 0 & N &> n\text{mod} \\ M2 &= n\text{mod} + N - 1 & N &<= 256 - n\text{mod} \\ &= 255 & N &> 256 - n\text{mod} \end{aligned} \tag{5}$$

The constant N here is supposed to be a predetermined positive integer. More specifically, N may be around 10. These tones M1 and M2 determine the section from which to extract the background distribution to be section [M1, M2] as shown in FIG. 11.

Next, the cumulative total of the relative frequencies of the picture elements in the section from which to extract the background distribution determined as described above is computed (step S220). This cumulative total of relative frequencies can be computed in accordance with Equation (6) below, utilizing Equation (3) above.

$$R = \sum_{k=M1}^{M2} r(k) \quad (6)$$

This cumulative total of relative frequencies R can be represented by the square measure of the shaded part surrounded by section [M1, M2] and the frequency distribution in FIG. 11.

By using the cumulative total of relative frequencies R in the section from which to extract the background distribution computed in this manner and the mode nmod in the frequency distribution, the presence of a background distribution is determined (step S225).

In this case, if the conditions of Equation (7) below are satisfied, the image is determined to have an area constituting a background:

R>Rth and nmod>nth (7)

where Rth and nth are predetermined positive integers, which constitute prescribed thresholds. More specifically, Rth is around 0.15 and nth, around 180. Of course, these values are no more than examples, and can be altered as appropriate. In this manner, the presence or absence of an area constituting a background is determined.

While this embodiment uses a configuration in which luminance levels are computed and a part constituting substantial white is determined to be a background, it is also possible, if this processing is applied to each color component on the basis of the frequency distribution of each color component and take into consideration the trend of each frequency distribution, to determine a background formed of different colors and their mixtures.

Therefore, as luminance levels are computed from tones constituting the color components of picture elements, frequency distributions of image data are charted, a background distribution by which to determine an area constituting a background in the image is charted from the frequency distributions, and the presence or absence of a background in the image is determined on the basis of a prescribed statistical quantity of this background distribution, background determination from step S210 through S225 constitutes the frequency distribution charting step A2 and the background determination step A3.

Figure 12:
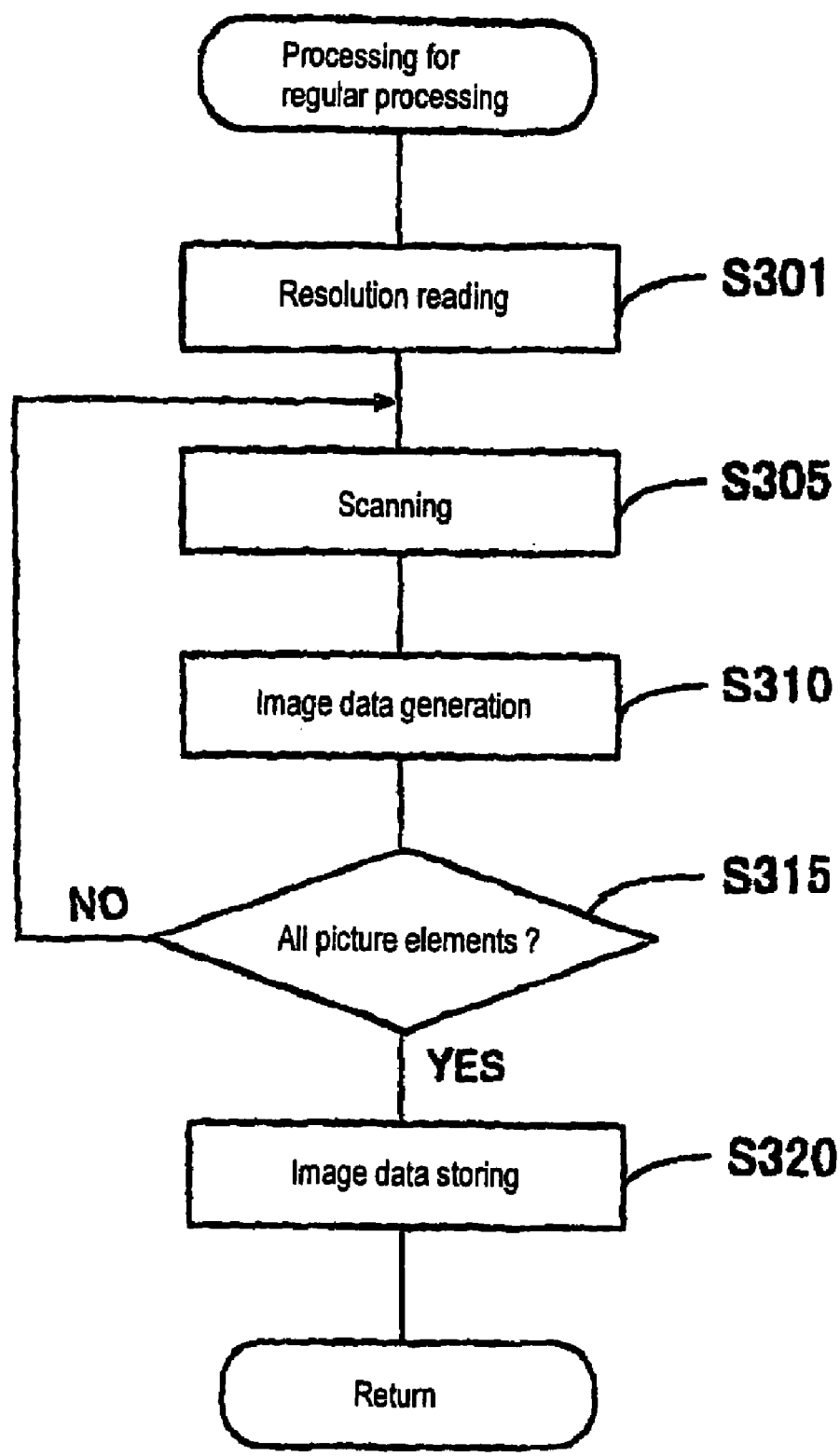
FIG. 12 is a flowchart schematically illustrating how the copy server processes the scanning.

Next, if it is determined that the image has a background, i.e. that there is a substantially white area consisting of a prescribed quantity of blank paper space, regular scanning is executed on the document image to be scanned mounted on the color scanner 20 to carry out to be described later correspondingly to this background area. The flowchart of FIG. 12 shows how this regular scanning is processed.

First the resolution level of the regular scanning set by the operator on the ten-key pad 35b is read out (step S301). It goes without saying that this resolution is denser than the resolution of the above-described pre-scanning.

The control circuit 25 of the color scanner 20 turns on the illuminating lamp 22 and starts scanning the image by giving a drive instruction to the drive motor 24c to slide the illuminating lamp 22 and the line sensor 23 (step S305).

Every time they are moved by a prescribed distance, the control circuit 25 generates image data on picture elements into which the image read by the line sensor 23 are divided according to the level of resolution (step S310), and transmits them to the copy server 30. The copy server 30 receives these image data via the I/F 37 and spools them on the hard disk 36. When it is judged here that the picture elements resulting from the division have wholly gone through scanning (step S315), the spooled image data are stored onto the hard disk 36 (step S320).

Therefore the regular scanning during which the image data of a document image are stored as they are acquired by executing high-resolution regular scanning, together with the above-described pre-scanning, constitutes image data acquisition step A1.

When the presence of an area constituting a background is determined in this way, picture elements close to substantial white are clamped to white, i.e. the highest tone level, in the image data retouching. Then, this clamped part, as no ink is applied to the print medium in the corresponding printing process by the color printer 40, remains a blank part of the paper. Accordingly, in the document image, the contrast between the background blank paper area and the black character part becomes clear, making possible retouching to obtain a contrasty attractive-looking image.

Figure 13:
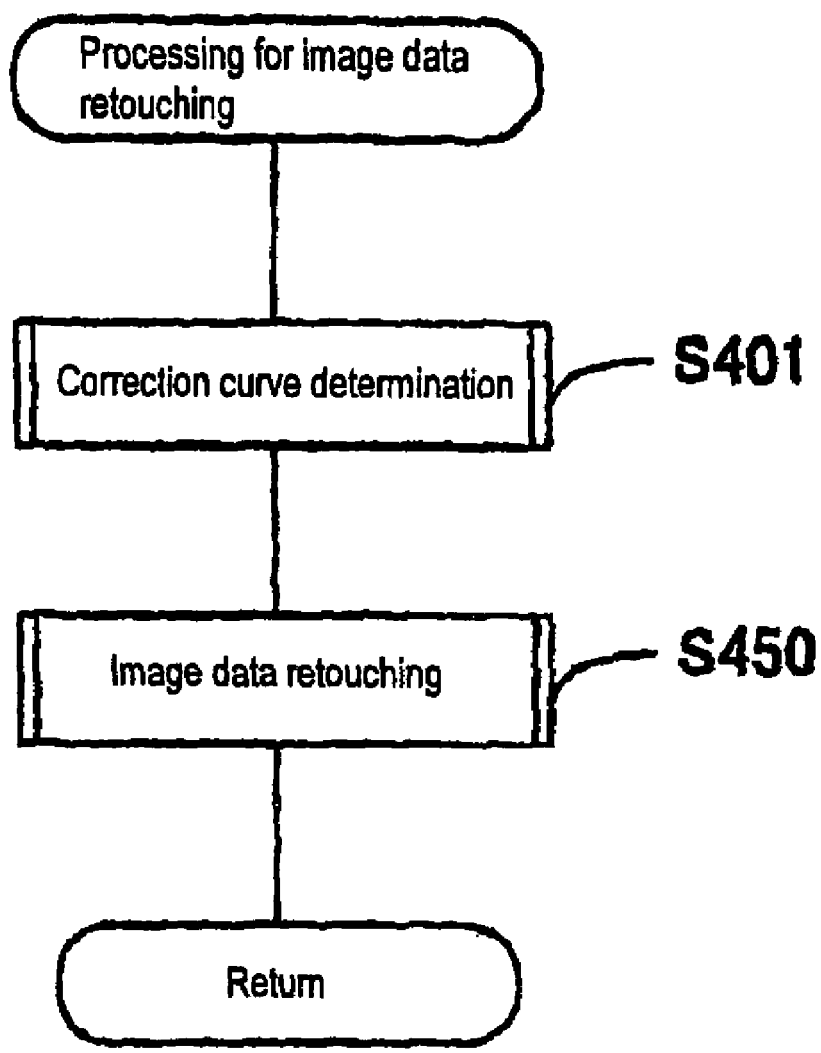
FIG. 13 is a flowchart schematically illustrating how the copy server processes image data retouching.

Next will be described how the image data retouching shown in the flowchart of FIG. 13 is carried out, together with detailed description of processing at each step.

Referring to FIG. 13, first, correction curve determination to determine the correction curve representing the relationship of correspondence in retouching the picture elements of image data is executed (step S401); then the tone of each color component of the picture elements is successively retouched in accordance with this correction curve (step S450); and image data are generated.

Figure 14:
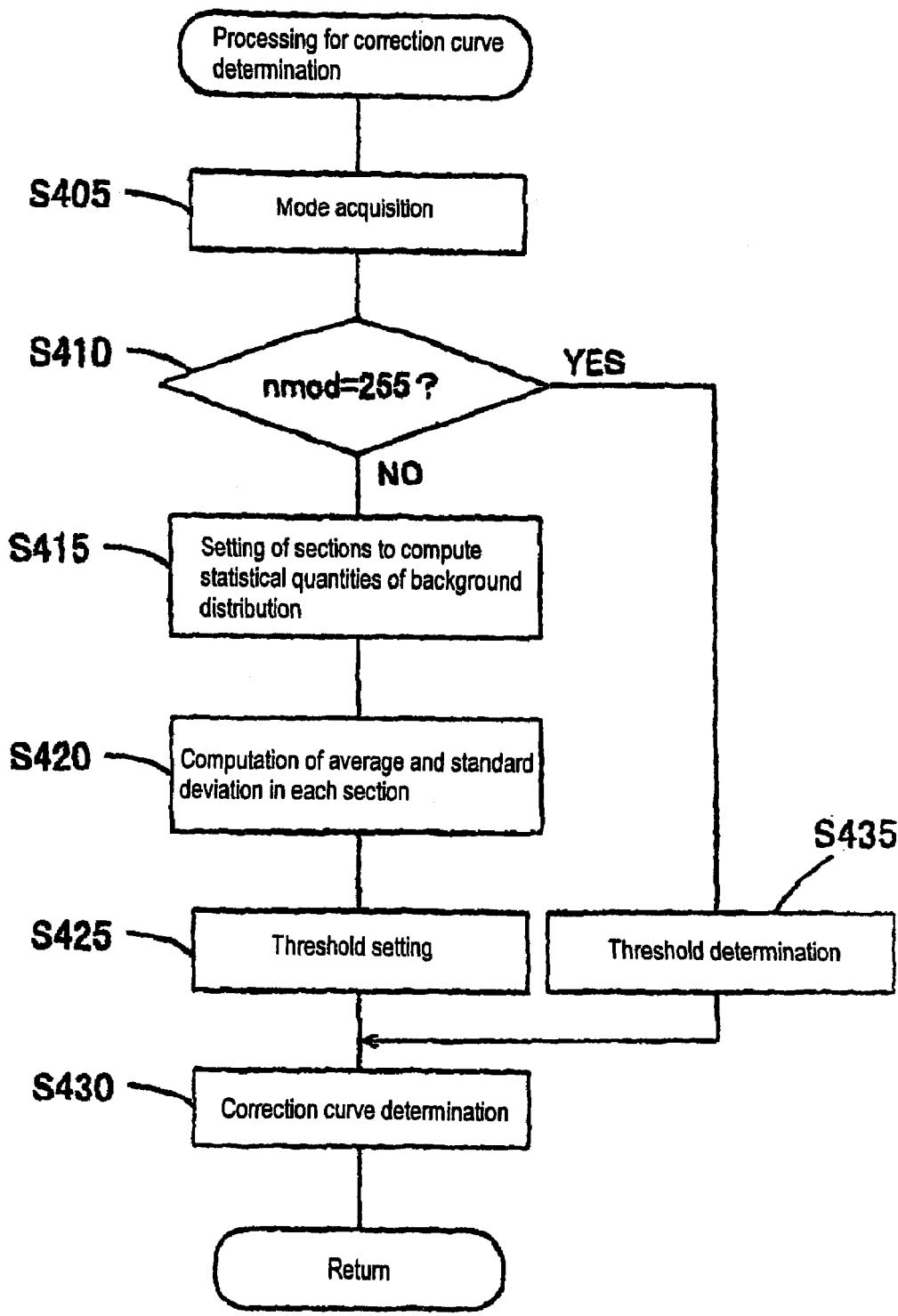
FIG. 14 is a flowchart schematically illustrating how the copy server processes the determination of a correction curve.

FIG. 14 is a flowchart showing how correction curve determination is executed at step S401.

Referring to FIG. 14, the mode nmod of the frequency distribution determined in accordance with Equation (4) is acquired (step S405), and it is determined whether or not the tone level of this mode nmod is 255, i.e. the highest tone (step S410).

Next, the section in which to compute the statistical quantity of the background distribution is set (step S415). The background distribution section set here may either be the aforementioned section [M1, M2] or, where the area supposed to be the background is a substantially white part, the tones to demarcated the area may be set to 255 on one side and to a tone level calculated in accordance with Equation (8) below on the other:

A=nmod−B*(255−nmod) (8)

where constant B is a predetermined variable, determined to satisfy the condition of Equation (9) below:

0<B<nmod/(255−nmod) (9)

where variable B, to be more specific, may be around 2. From the above, the section in which to compute the statistical quantity of the background distribution is determined to be section [A, 255].

Then, an average nave in this section [A, 255] is computed in accordance with Equation (10) below, and a standard deviation nstd is computed by Equation (11) below (step S420).

$$nave = \frac{\sum_{k=A}^{255} k * f(k)}{\sum_{k=A}^{255} f(k)} \quad (10)$$

$$nstd = \left( \sum_{k=A}^{255} f(k) * (k - nave) 2 \Big/ \sum_{k=A}^{255} f(k) \right)  (1/2) \quad (11)$$

By utilizing these average nave and standard deviation nstd, the threshold T of the correction curve is computed in accordance with Equation (12) below (step S425):

$$T = nave - C * nstd \quad (12)$$

where constant C is set to satisfy the conditions of Equation (13) below:

$$\begin{aligned} C &= C2 \quad 1 - R \geq Cth2 \\ &= C1 \quad Cth1 \leq 1 - R < Cth2 \end{aligned} \quad (13)$$

where C1 and C2 are predetermined positive integers, and Cth2 is set in accordance with Equation (14) below by using Rth.

$$Cth2 = 1 - Rth \quad (14)$$

Figure 15:
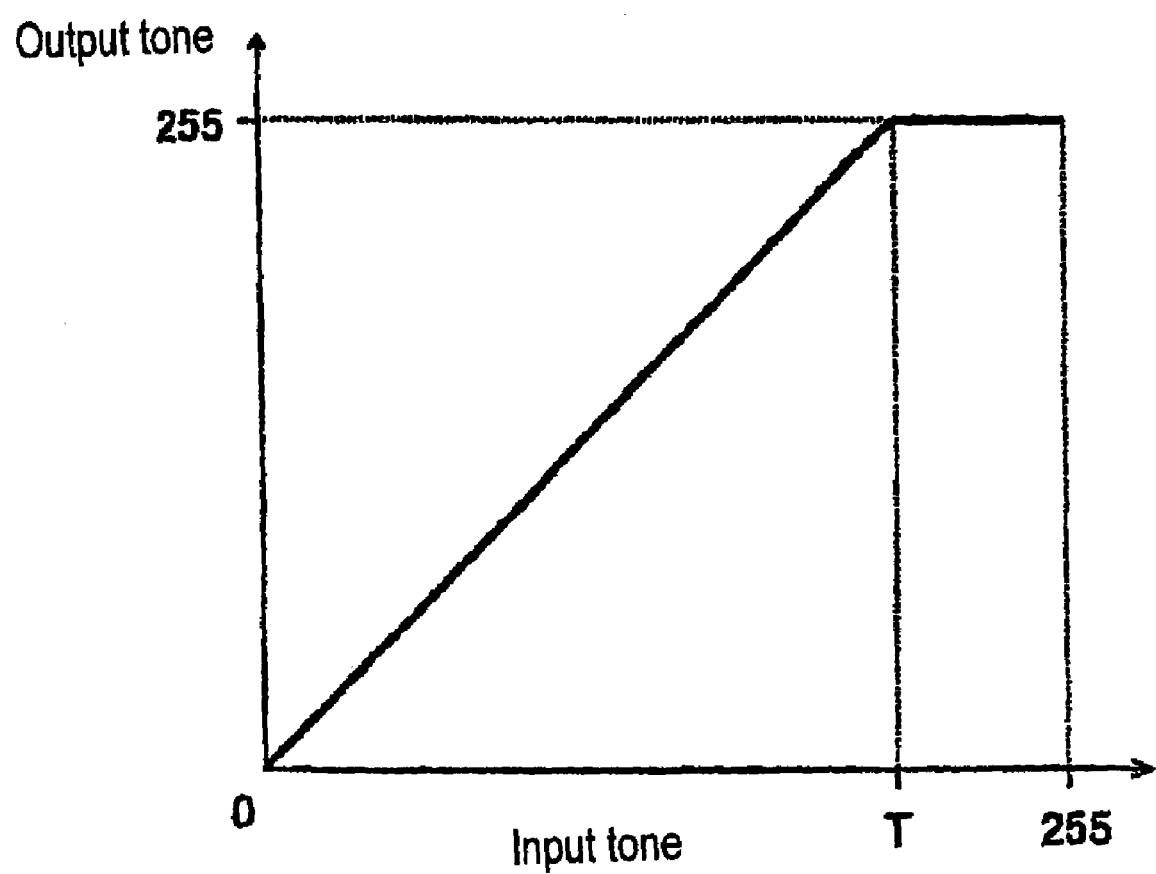
FIG. 15 illustrates an example of correction curve determined by that correction curve determination.

In this embodiment, C1 is set to be about 4, C2, about 2, and Cth1, about 0.7. When the threshold T is computed in this way, the correction curve is determined. In this embodiment, the correction curve, as shown in FIG. 15, clamps the input tones at and after the threshold T to the tone level 255, and forms the range between input tones 0 and T in a straight line having an inclination of 255/T.

Of course, it would be sufficient to be able to clamp the input tone of a tone level 255 from the threshold T to an output tone 255, or to make the line the input tones of between 0 and T a quadratic curve or a straight line having a different inclination, changes between them permissible as required. Such a correction curve is prepared for each set of RGB data. If the mode nmod was 255 at step S410, a straight line having an inclination of 1 linking (0, 0) and (255, 255) in input tone and output tone is generated. Thus the tone of the threshold T is selected to be 255.

Next will be described how image data retouching at step S450 is carried out with reference to the flowchart of FIG. 16.

Figure 16:
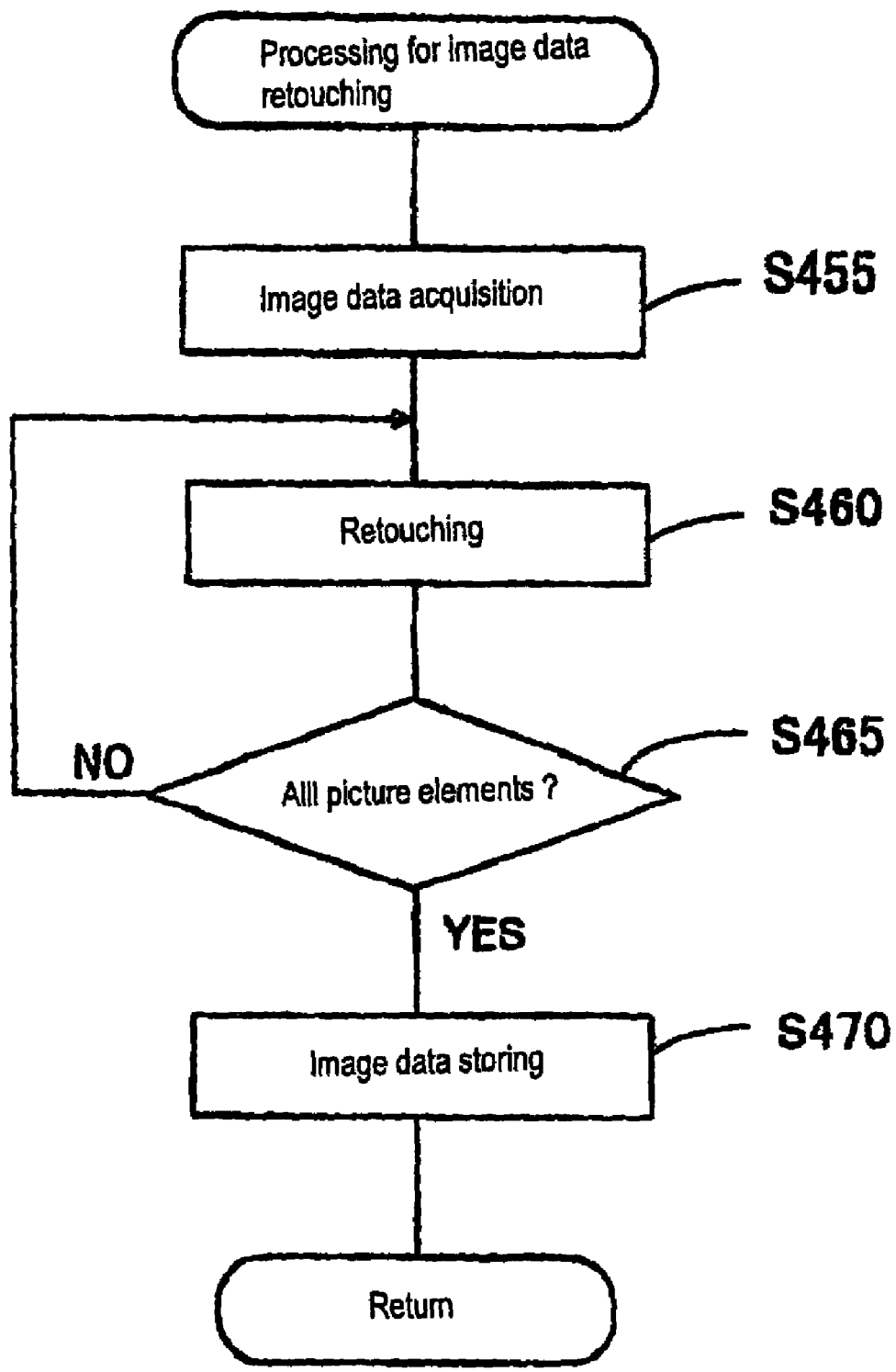
FIG. 16 is a flowchart schematically illustrating how the copy server processes the retouching of image data.

Referring to FIG. 16, first, image data generated by regular scanning are acquired (step S455). The picture elements of the image data are scanned, and the tone of the each color component of each picture element, as input tone, is substituted into the correction curve to compute the output tone (step S460). It is determined whether or not all the picture elements of the image data acquired at step S455 have gone through retouching based on the correction curve (step S465) and, if they are not, the process returns to step S460 to scan the next picture elements and thereby to execute retouching based on the correction curve successively. If all the picture elements have been retouched, image data composed of output tones are stored onto the hard disk 36 (step S470).

The image data so generated through image data retouching are subjected to color conversion and the like, and delivered to the color printer 40 to be printed.

Hereupon, it will be described with reference to the flowchart of FIG. 17 how image data conversion to be executed on the retouched image data before they are delivered to the color printer 40 are processed.

Figure 17:
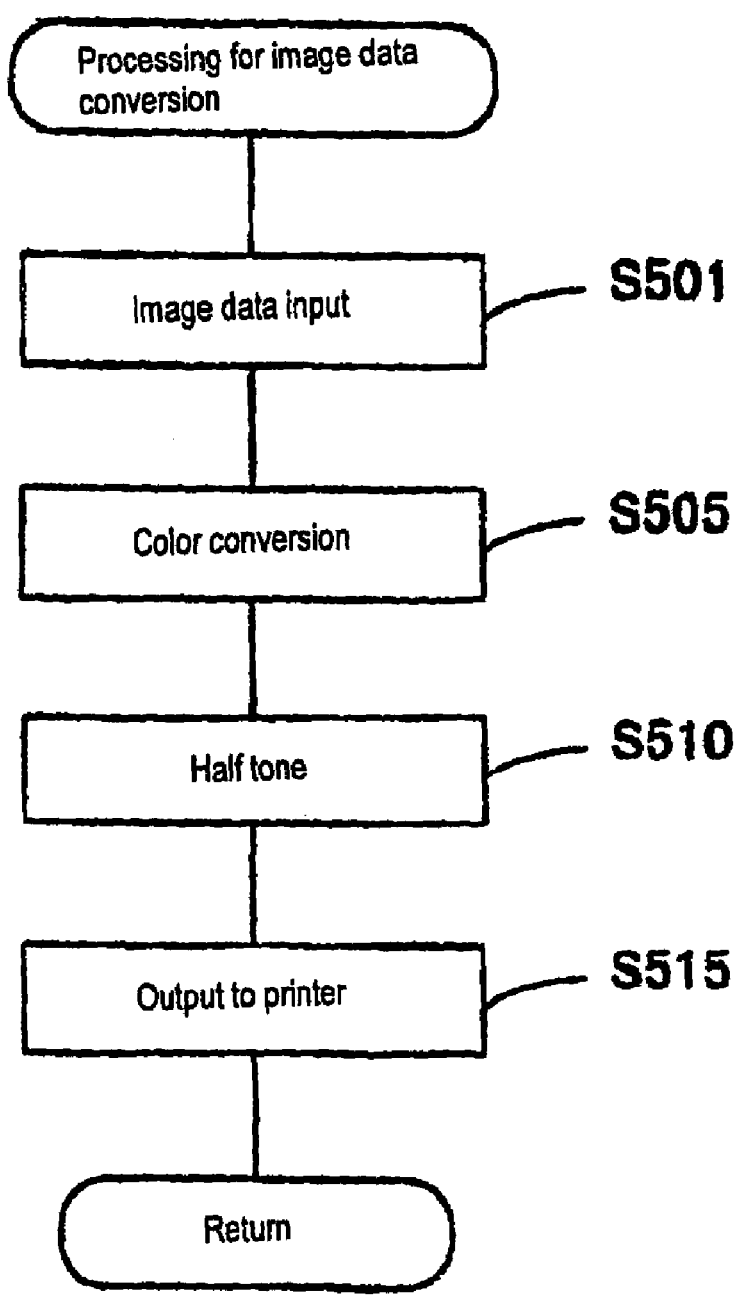
FIG. 17 is a flowchart schematically illustrating how the copy server processes the conversion of image data.

Referring to FIG. 17, first, image data retouching is executed, and image data of which every picture element consists of an output tone are entered (step S501) and subjected to color conversion (step S505). If the image data are in usual RGB 256 tones, the printer 50 will require color image data for CMYK 2 tone printing, and this necessitates color conversion and tone conversion. Therefore at step 505, the RGB 256 tone color image data are converted into CMYK 256 tone color image data. For this purpose, color conversion may be executed using LUT in accordance with a standard technique. Then, the CMYK 256 tones are converted into halftones of CMYK 2 tones (step S510), and the halftone data are transmitted from the PC 10 to the printer 50 by parallel communication (step S515).

The change in the state of the image data from before to after the image data retouching is shown in FIG. 18. The image data before the execution of image data retouching is shown in FIG. 18A, and those after that, in FIG. 18B. In these figures, each small box represents one or another of the picture elements constituting the image data, and picture elements of tone 0 indicate positions which are black-colored in the image. On the other hand, picture elements of tone 255 indicate positions which are white-colored in the image, i.e. the blank paper are in the document image.

Figure 19A:
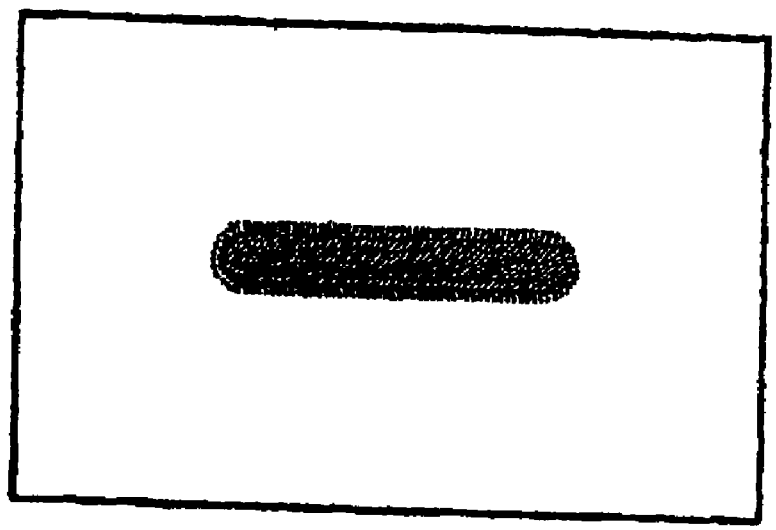
FIGS. 19A–19B illustrate how a contrasty image is obtained by the image data retouching.
Figure 19B:
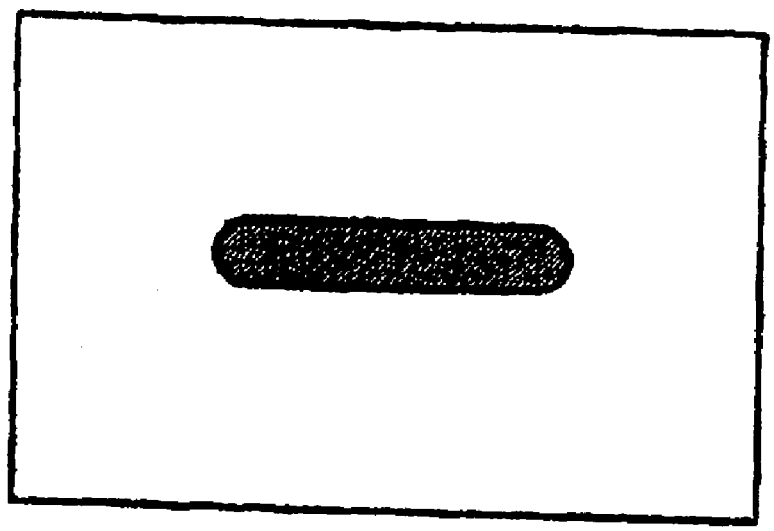

It is seen here that, in FIG. 18A, there are a black-colored part and gray picture elements, shadowed in the illustration, on the boundary of the blank paper part. The presence of these picture elements blur the boundary between black and white, resulting in a document image lacking in contrast as shown in FIG. 19A. On the other hand, where the above-described image data retouching is executed, since this gray part is clamped to the highest tone of 255 as shown in FIG. 18B, there can be drawn a clear boundary between the black and white parts, resulting in a contrasty image as illustrated in FIG. 19B.

Thus it is made possible to scan a document with a color scanner 40, and identify on the basis of the frequency distributions of image data constituting the document image the blank paper area constituting the background in the document image, i.e. the substantially white area. Further, once the presence of a background is determined, the substantially white background area is retouched to white, i.e. the highest tone, by image data retouching according to a correction curve, so that clear contrast can be established between the background and the non-background image reproduced from image data and noise components in the background, such as what is written or drawn on the wrong side of the paper seen through.

Figure 20:
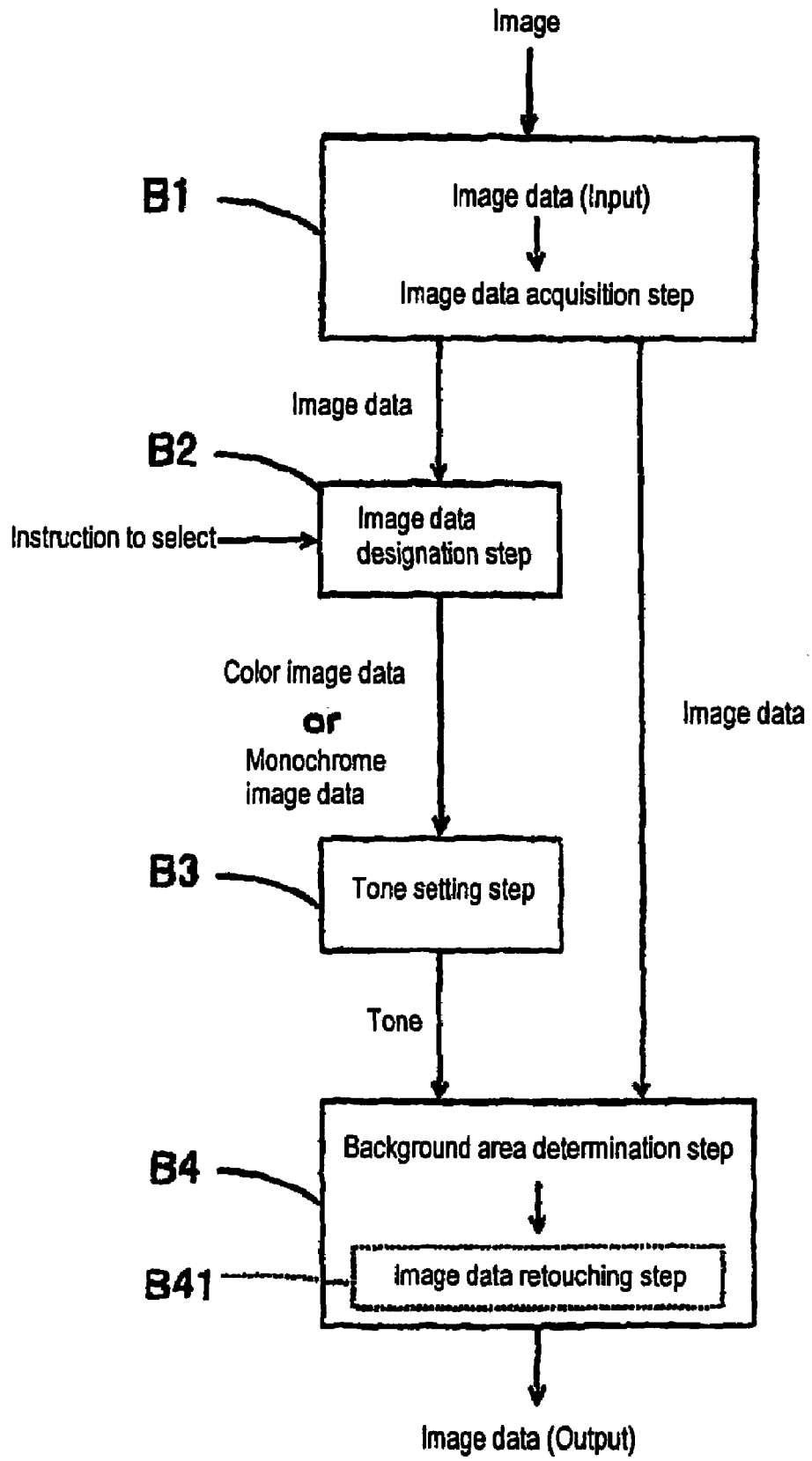
FIG. 20 is a schematic diagram of an image data background determining method in another preferred embodiment of the invention.

FIG. 20 is a schematic diagram of an image data background determining method in another preferred embodiment of the invention.

Referring to FIG. 20, by this image data background determining method, in setting as the background of the image the area near the high tone of the picture elements schematically constituting the image data, this setting is made variable according to whether the image is in color or monochrome.

More specifically, at image data acquisition step B1, image data representing the image in multiple tones in picture elements in a dot matrix arrangement are acquired. Then at an image data designating step B2, the color components and other aspects of these image data are analyzed, or in response to an instruction to select from the user, whether the image data are color image data or monochrome image data is designated.

Then as designated at the image data designating step B2, a tone according to which a reference area for determining a background is demarcated is set at a tone setting step B3. Then at a background area determination step B4, according to the tone set at the tone setting step B3, it is determined whether or not picture elements constituting the image data belong to a background. Further at image data retouching step B41, if the presence of a background has been determined, the picture elements of the entered image data are retouched. In this case, at image data retouching step B41, a prescribed correction curve indicating the relationship of correspondence in retouching is generated, on the basis of which the picture elements are retouched to generate image data to be supplied.

Figure 21:
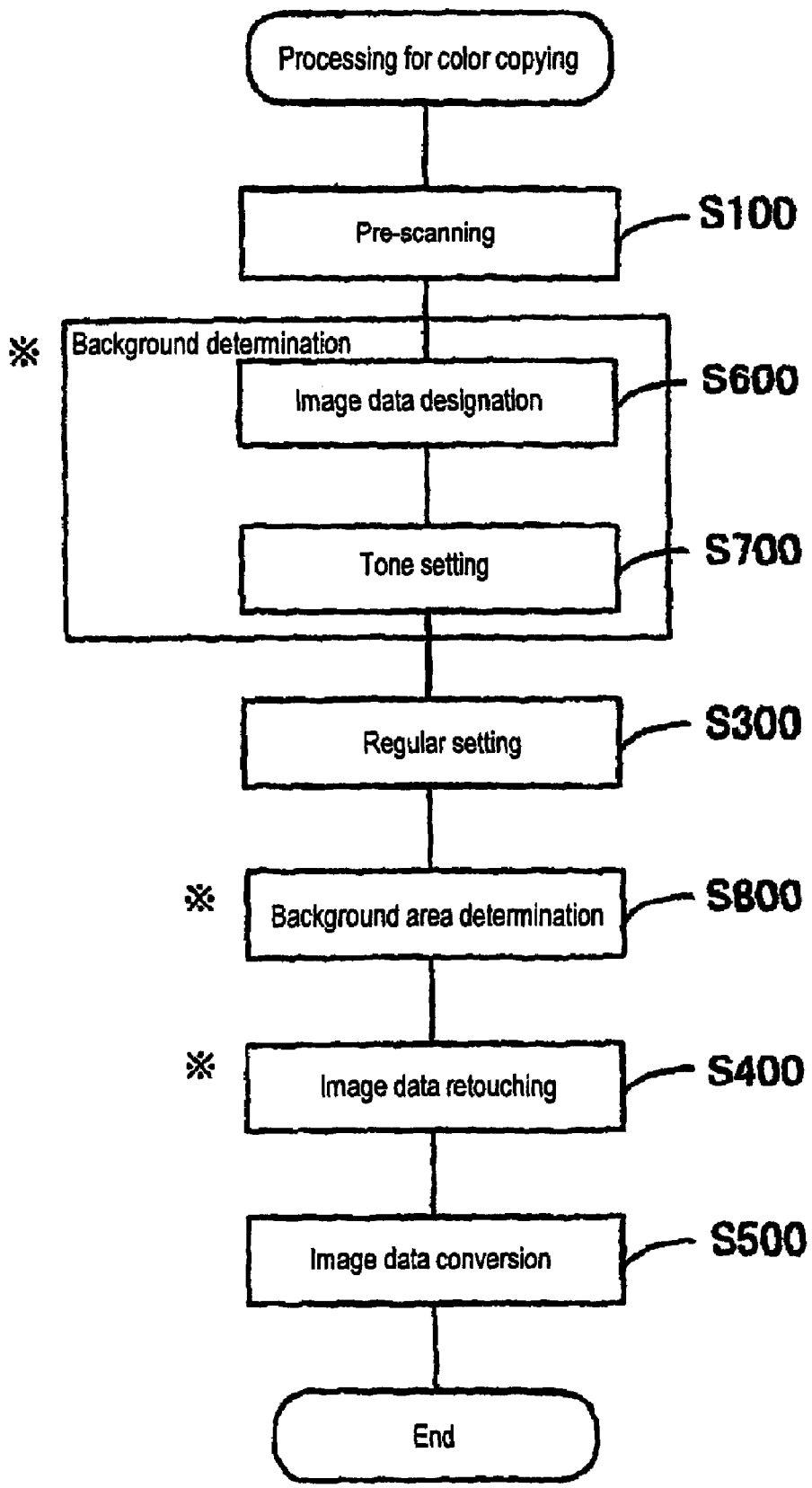
FIG. 21 is a flowchart schematically illustrating how the copy server processes color copying.

FIG. 21 is a flowchart schematically illustrating how image data background area determination is processed in this embodiment. As illustrated here, in place of the background determination at step S200, image data designation (step S600) and tone setting (step S700) are carried out and, after regular scanning at step S300, background area determination is carried out as step S800 to alter the image data retouching of step S400.

Referring to FIG. 21, pre-scanning is executed (step S100), and it is determined and designated by a prescribed technique on the basis of image data generated by the pre-scanning, whether the object of scanning is color image data or monochrome image data (step S600).

Then in accordance with this designation, a tone range to demarcate the background in the image to be scanned, i.e. the area constituting the blank paper area, is set (step S700). If color image data are designated here, the demarcating tone is set toward the high tone or, if monochrome image data are designated, the demarcated tone range is set from the high tone to the low tone more broadly than for color image data.

Then, regular scanning of high resolution to acquire detailed image data on the image to be scanned is carried out (step S300); it is detected whether or not the picture elements of the image data read in by this regular scanning are included in the area constituting a background demarcated according to the tone range set at step S700; and the presence or absence of a background in the image is determined on the basis of the number of picture elements included in this demarcated section (step S800).

If the presence of a background is determined, a correction curve based on the prescribed statistical value of this demarcated area is determined, and image data retouching to clamp the picture elements of the area determined to be a background according to this correction curve to the maximum tone, i.e. white, is executed (step S400).

Since the picture elements of substantial white close to the high tone are thus clamped to white, i.e. the highest tone, if the presence of an area constituting a background is determined, no ink will be applied in the printing process by the color printer 40 to the part of the print medium corresponding to this clamped section. Therefore, it will remain of a blank paper part. In this embodiment, if an image of monochrome image data is to be scanned, because the demarcated tone range is set more broadly from the high tone to the low tone, the image data retouching provides clear contrast between the background blank paper area and the black part of characters, resulting in retouching to a contrasty, more attractive image. Or if an image of color image data is to be scanned, because the section to be determined as a background is set more narrowly toward the high tone, picture elements of the color part is prevented from being caused to leap to the highest tone by the image data retouching.

Further steps of processing will be described more specifically below with reference to the flowcharts of FIG. 22 and subsequent figures.

Figure 22:
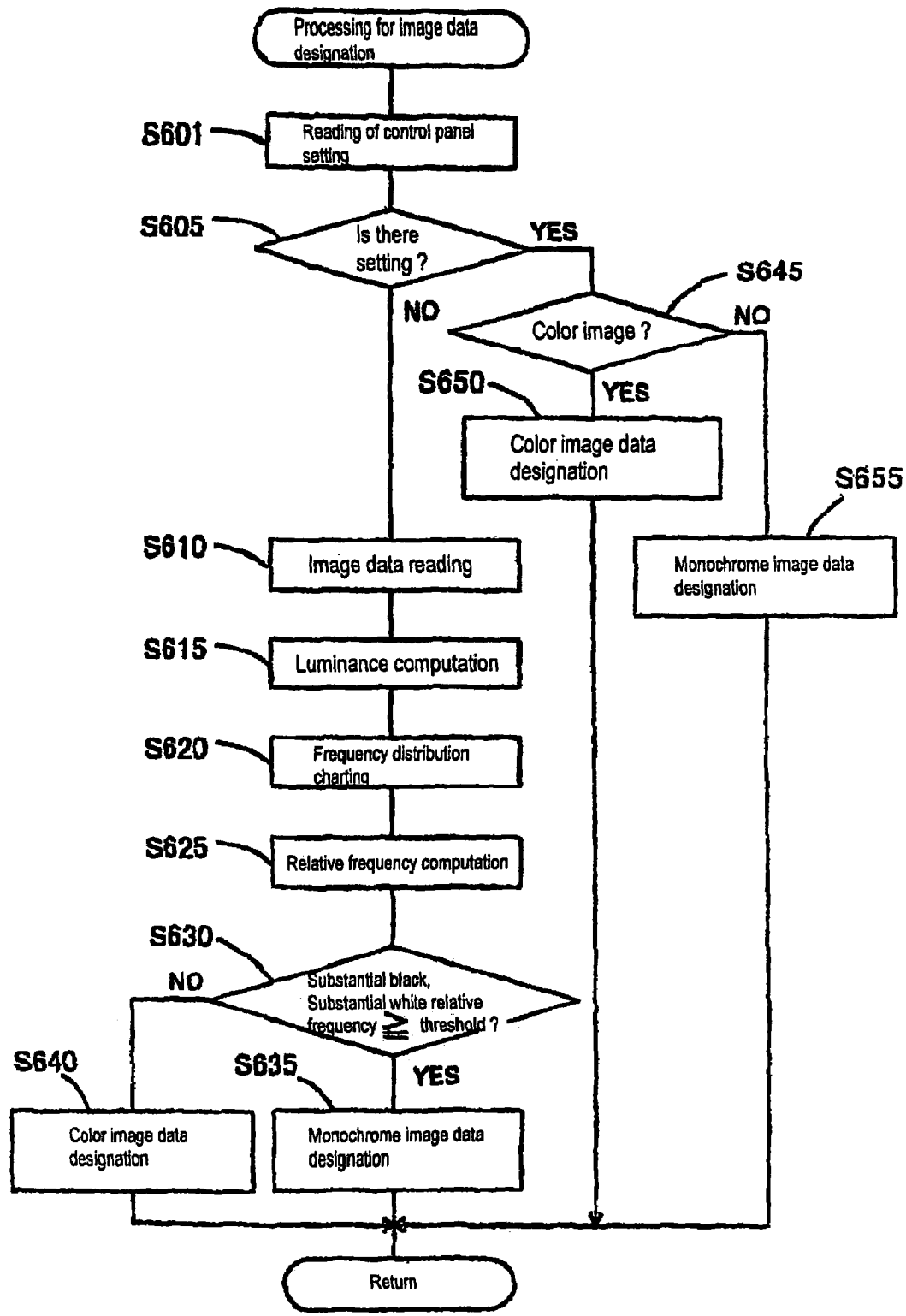
FIG. 22 is a flowchart schematically illustrating how the copy server processes image data designation.

FIG. 22 is a flowchart schematically illustrating how the copy server processes image data designation of step S600.

Referring to FIG. 22, first, in designating the object of scanning as being composed of color image data or of monochrome image data, priority is given to the setting made by the user on the control panel 35, so that this setting, if any, is read out (step S601) to confirm the presence or absence of such setting (step S605). If there is no setting, image data generated by pre-scanning are read out to designate whether the object of scanning is color image data or monochrome image data on the basis of the color components of the picture elements of image data (step S610).

Now the red (R), green (G) and blue (B) components of the picture elements constituting the image data are extracted. Since each color component has densities of 0 to 255 in tone level, a luminance level Y is computed for each picture element by substituting the tone level of somewhere between 0 and 255 of the RGB data into Equation (1) (step S615).

Figure 23:
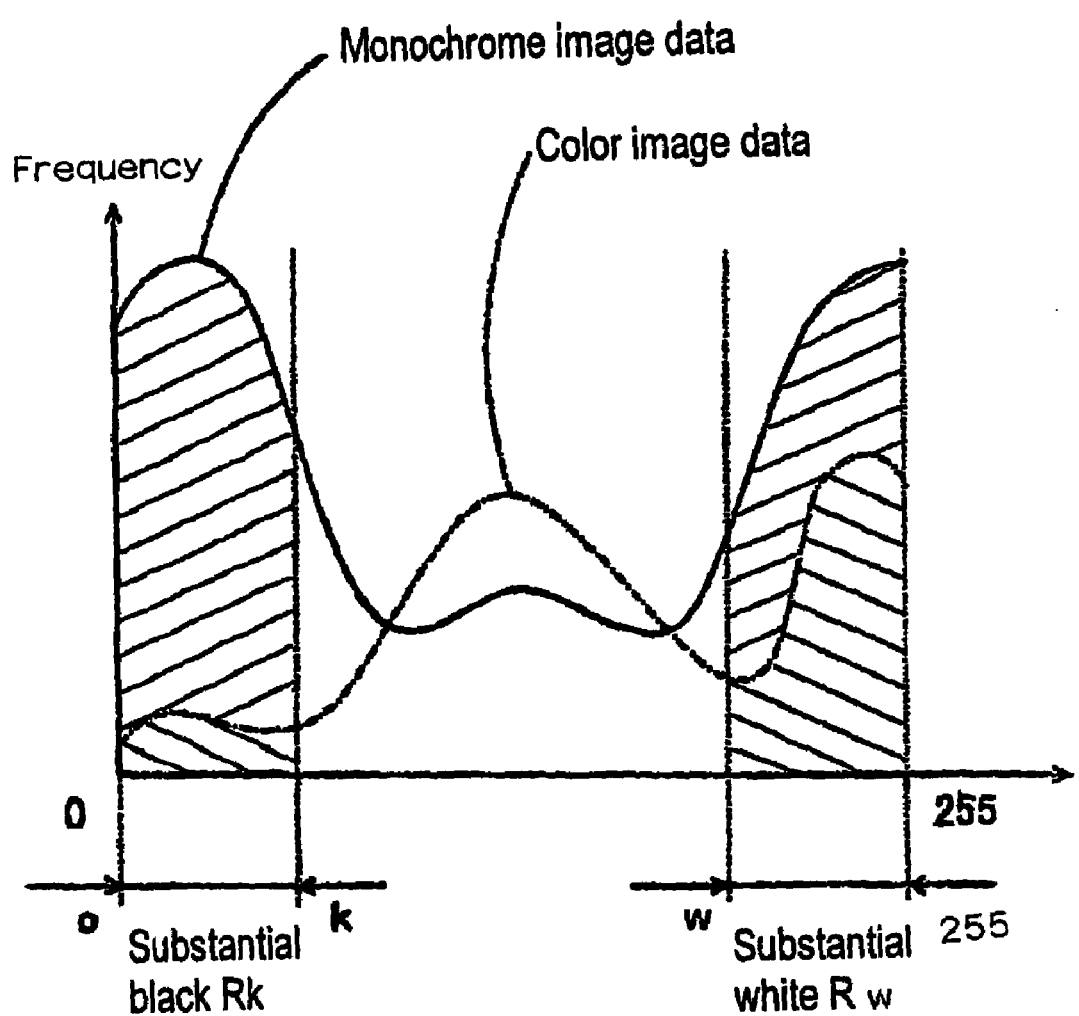
FIG. 23 illustrates a frequency distribution of image data charted according to the image data designation.

After computing a luminance level for every picture element of the image data according to Equation (1), picture elements are counted for every luminance tone level between 0 through 255 to chart frequency distributions as shown in FIG. 23 (step S620).

Then, a relative frequency r(i) at each tone level between 0 and 255 is computed, and whether the image is a color image or a monochrome image is determined according this relative frequency r(i). Therefore, a relative frequency Rk in a section where the tone is substantially black and in a section where the relative frequency Rw is substantially white are computed respectively in accordance with Equations (15) and (16) below, where k and w (k<w) are experimentally obtained values.

$$R_k = \sum_{i=0}^{k} r(i) \tag{15}$$

$$R_w = \sum_{i=w}^{255} r(i) \tag{16}$$

These relative frequencies Rk and Rw can be represented by the areas of shaded parts respectively surrounded by sections [0, k] and [w, 255] and frequency distributions in FIG. 23. It is then judged whether or not each of these relative frequencies is at or above a prescribed threshold (step S625). If it is, the pertinent image data are determined to be monochrome image data, which are then designated (step S630). On the other hand, if it is not, the pertinent image data are determined to be color image data, which are then designated (step S635). Conceptually, when the frequency distribution is represented by the solid line in FIG. 23 and number of picture elements contained between sections [0, k] and [w, 255], the image data are determined to be monochrome image data and, conversely, when the number of picture elements is small as represented by the one-dot broken line, they are determined to be color image data.

If the presence of setting by the user is confirmed at step S605, it is determined whether this setting is for color image, and if it is, color image data are designated (step S640) or, if it is not, monochrome image data are designated (step S645).

Therefore, the luminance level is computed from the user's instruction or the tone constituting the color component of each picture element to chart the frequency distributions of image data, and at the same time it is designated according to the frequency distributions whether the image consists of color image data or of monochrome image data, so that this image data designation constitutes the image data designating step B2.

While this embodiment uses a configuration in which it is determined whether image data are in color or monochrome according to the frequency distributions of luminance, the technique for determining whether image data are in color or monochrome is not limited to this, but it is also acceptable to adopt a configuration in which the color saturation of each picture element is extracted and determination is done as to whether image data are in color or monochrome according to whether or not picture elements having a prescribed chromatic saturation are above a prescribed threshold.

Then, tone setting at step S700 is executed in accordance with this designation to set the tone to demarcate the background area in the image.

Figure 24:
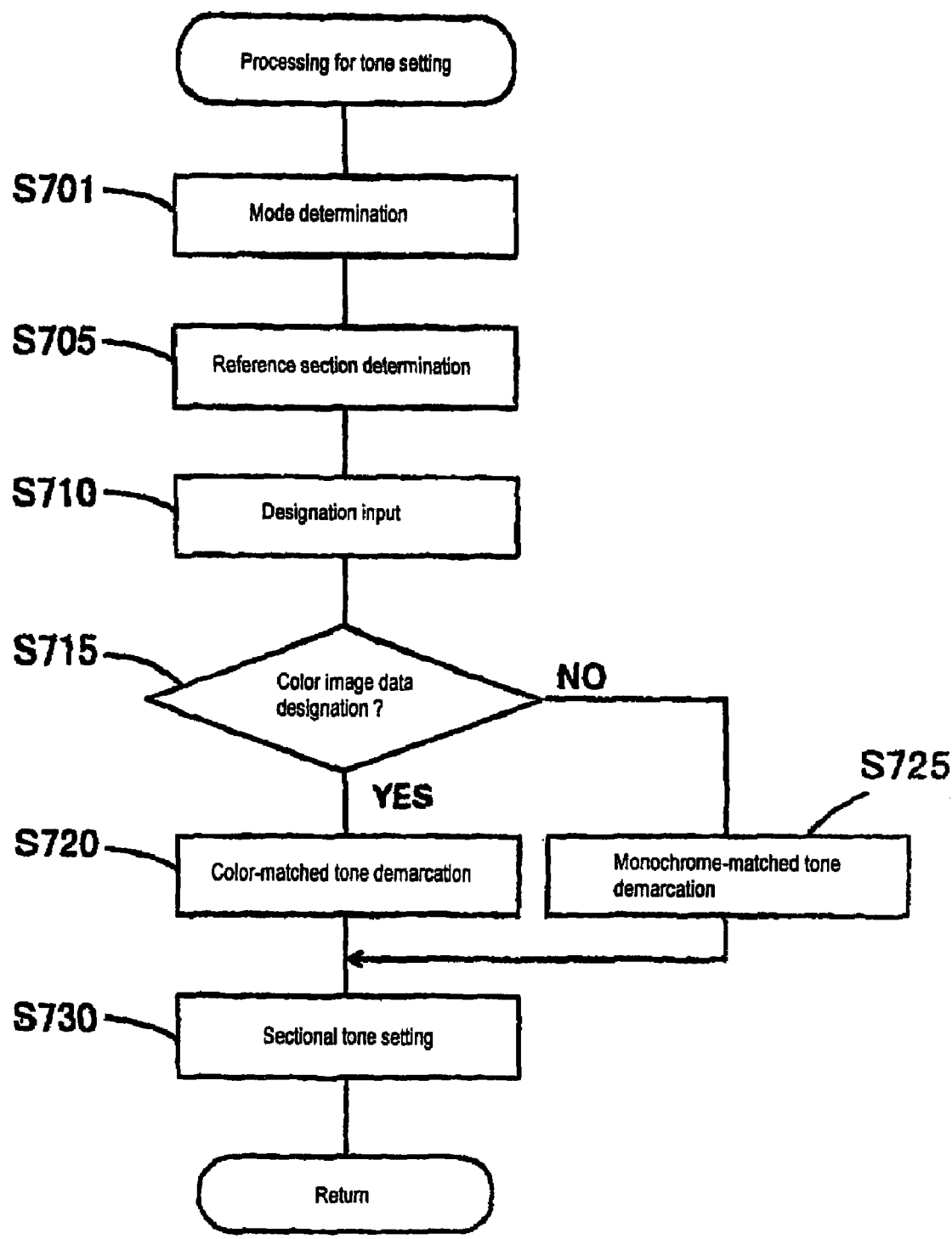
FIG. 24 is a flowchart schematically illustrating how the copy server processes tone setting.

FIG. 24 is a flowchart schematically illustrating how this tone setting is carried out.

Referring to FIG. 24, first, in order to set a reference section, the highest frequency in the frequency distribution determined in accordance with Equation (4) cited above (step S701).

A tone corresponding to this highest frequency fmod is determined to be the mode nmod. This mode nmod, as shown in FIG. 11, is the peak tone of the frequency distribution. By utilizing this mode nmod, tones M1 and M2 to demarcate the reference for the background area are determined in accordance with Equation (5) cited above (step S705).

Figure 25A:
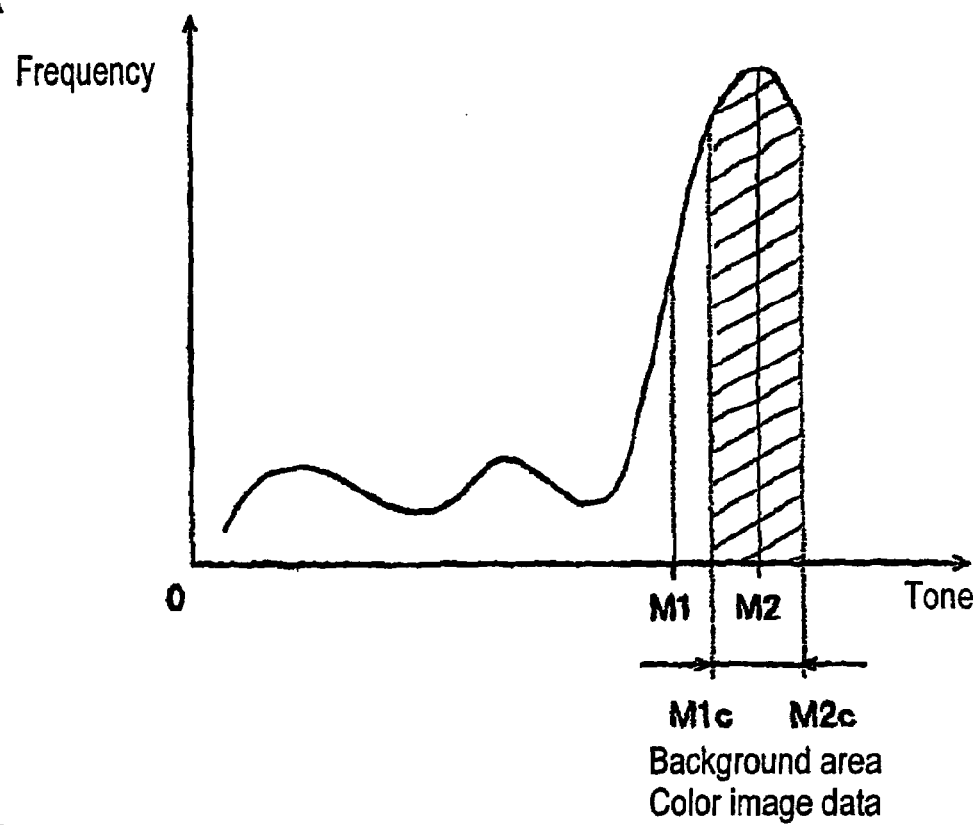
FIGS. 25A–25B illustrate a section for color image data and a section for monochrome image data set by the tone setting.
Figure 25B:
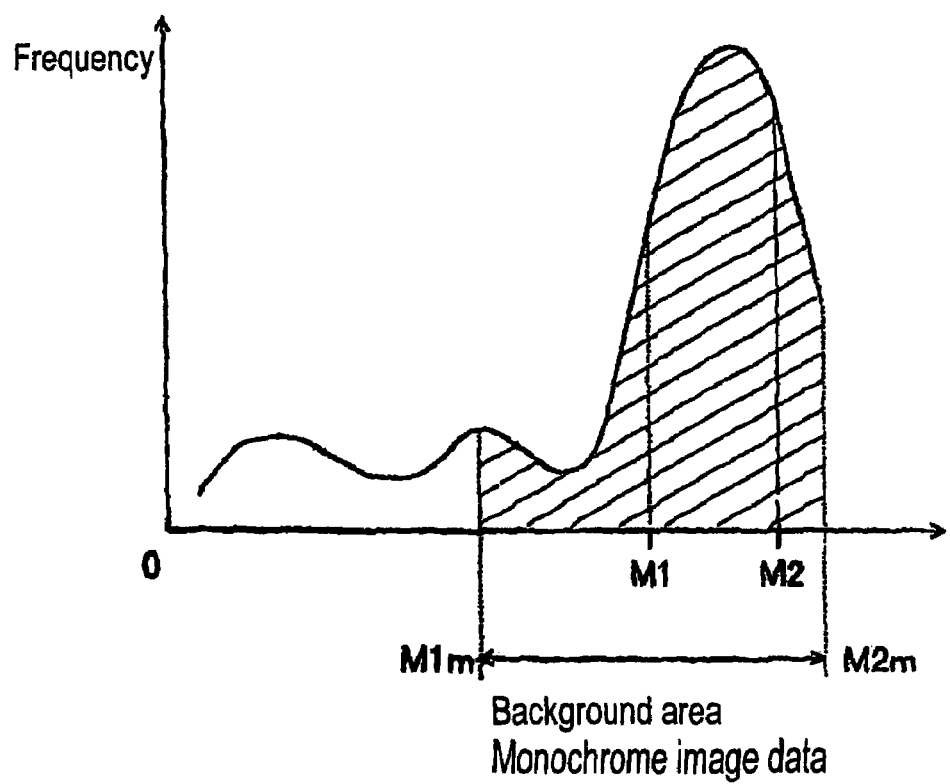

Then, the content of the image data designation is entered (step S710), and it is determined whether or not this designation is for color image data (step S715). If it is, as shown in FIG. 25A, a section [M1c, M2c] toward the high tone by a prescribed tone equivalent is set (step S720), or if the designation is for monochrome image data, as shown in FIG. 25B, a section [M1m, M2m] resulting from the expansion of the aforementioned reference section toward both the high tone and the low tone by a prescribed tone equivalent each is set (step S725). The applicable one of these sections is set to be the background area (step S730). Therefore, this tone setting constitutes the tone setting step B3.

Next, in order to determine whether or not the image has a background, regular scanning is executed.

Figure 26:
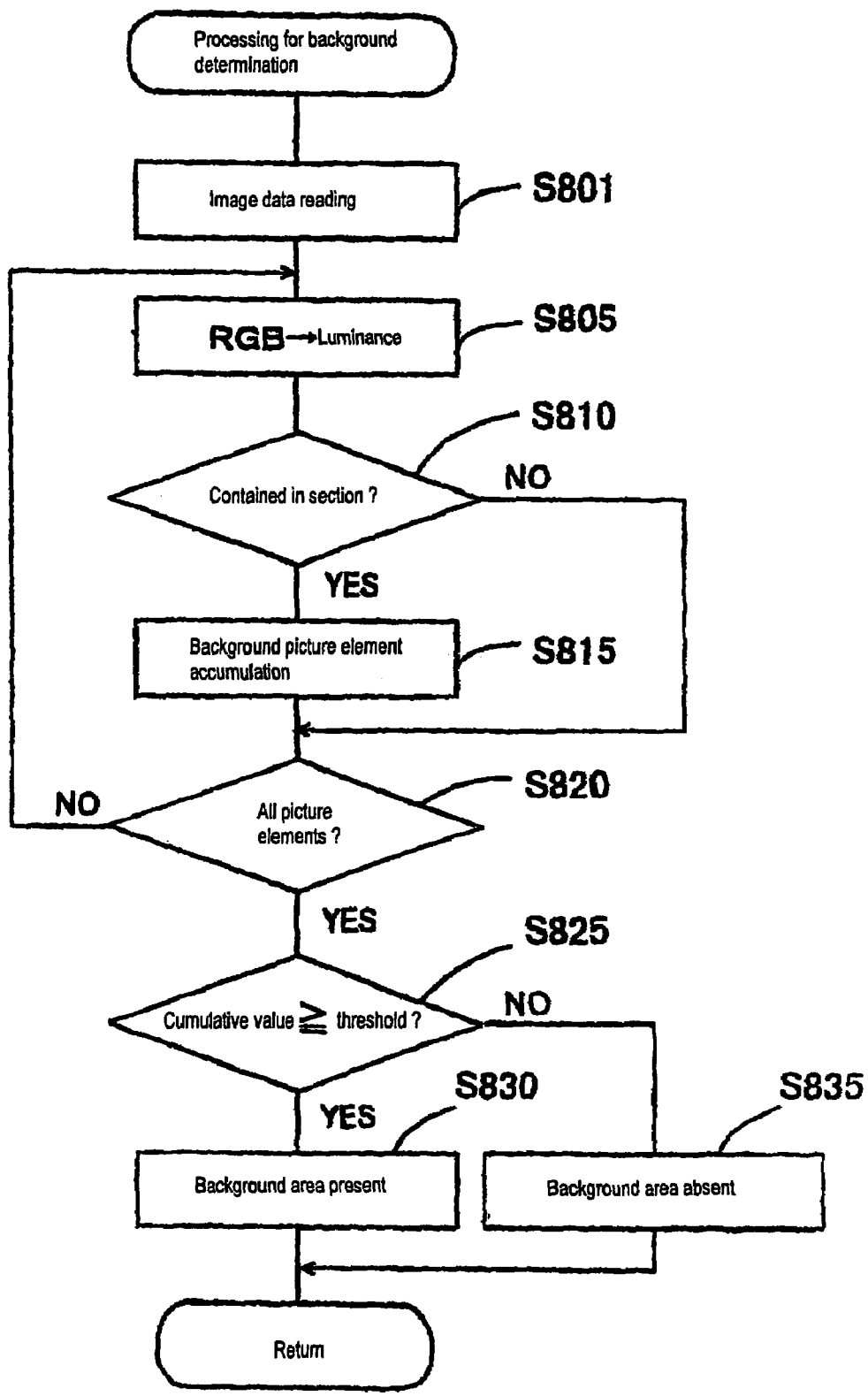
FIG. 26 is a flowchart schematically illustrating how the copy server processes background area determination.

FIG. 26 is a flowchart illustrating how the background area determination at step S800 is processed.

Referring to FIG. 26, first, the image data acquired by regular scanning are read out (step S801). Then, a luminance level is computed for every picture element of the image data according to Equation (1) (step S805). It is judged whether or not this computed luminance tone is contained in the background area set in tone setting (step S810) and, if it is, it is accumulated as a background picture element (step S815). The processing of these steps S805 through S815 is applied to all the picture elements (step. S820), and upon its completion it is determined whether or not the number of picture elements accumulated at step S815 is at or above a prescribed threshold (step S825). If the number of accumulated picture elements here is not below the threshold, it is determined that there is a background area (step S830) or, if it is below the threshold, it is determined that there is no background area (step S835).

Now will be described the process of image data retouching illustrated in the flowchart of FIG. 27.

Figure 27:
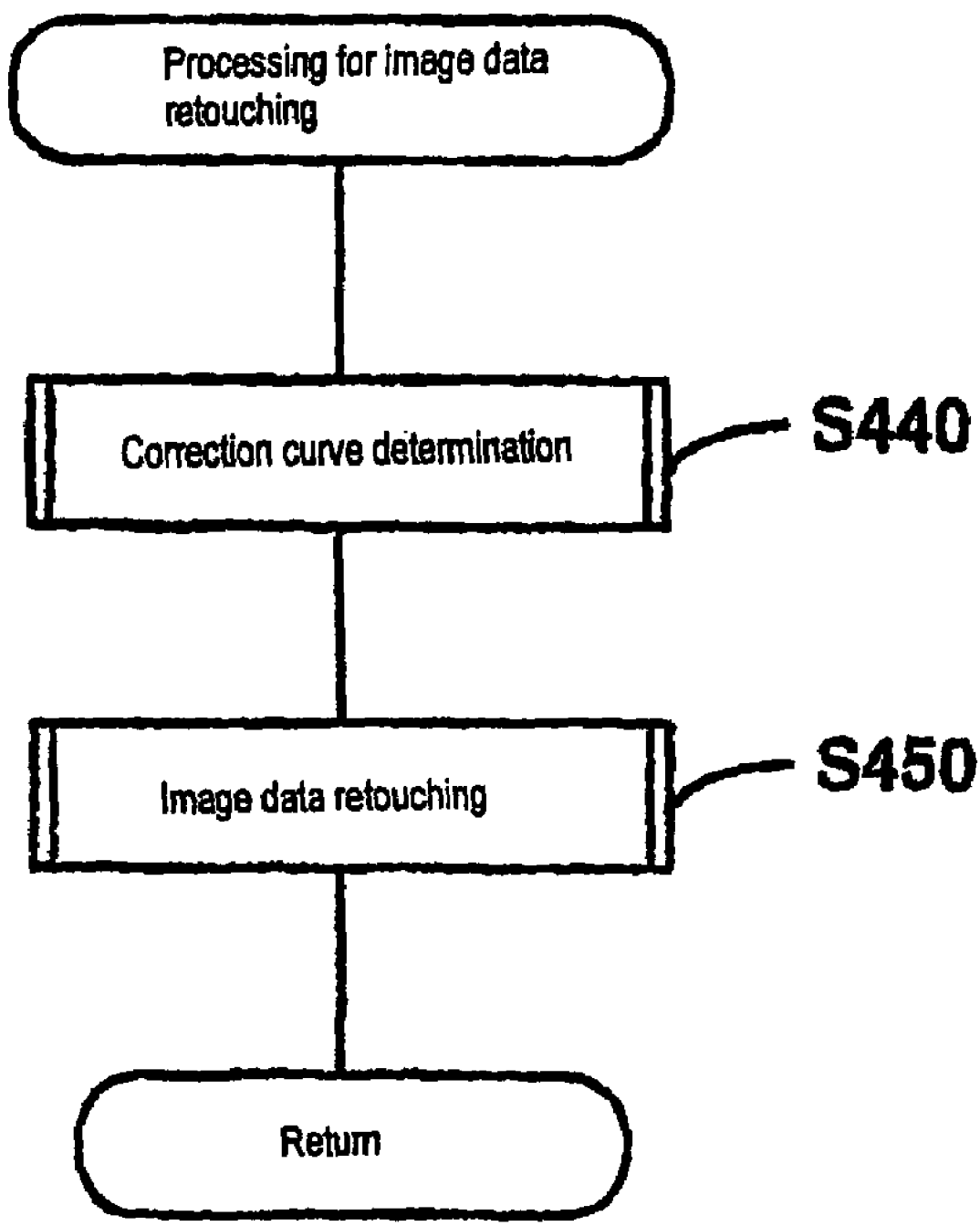
FIG. 27 is a flowchart schematically illustrating how the copy server processes image data retouching.

Referring to FIG. 27, first, correction curve determination is executed to determine a correction curve indicating the relationship of correspondence on the basis of which the picture elements of image data (step S440) and then, in accordance with this correction curve, the tones of color components of picture elements are successively retouched (step S450) to generate image data.

Figure 28:
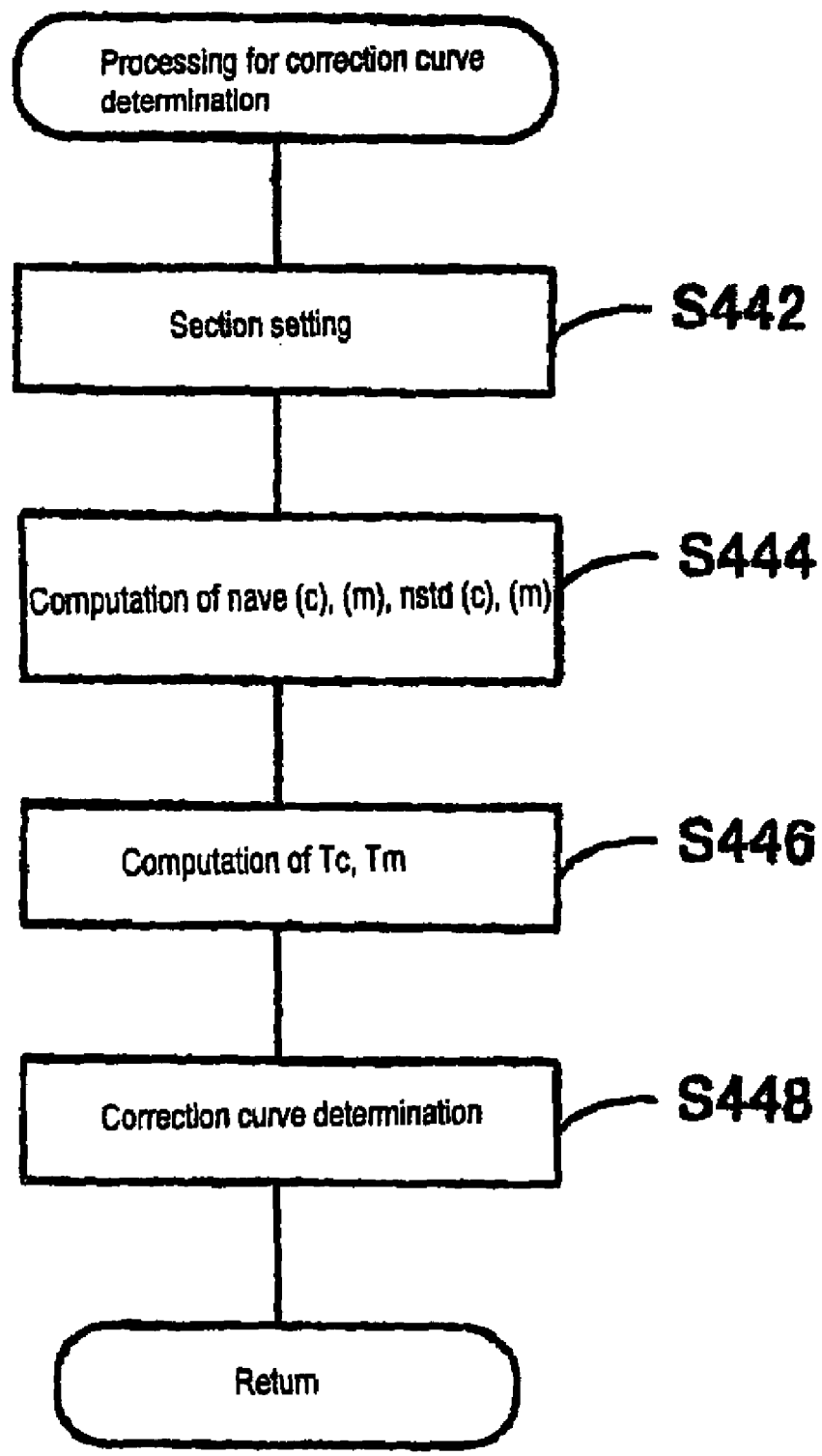
FIG. 28 is a flowchart schematically illustrating how the copy server processes correction curve determination.

FIG. 28 is a flowchart illustrating how correction curve determination is executed at step S401.

Referring to FIG. 28, first, a section in which to compute the statistical quantity of the background area is set (step S442). The section set here, where the image data are in color, is the aforementioned section [M1c, M2c] or, if they are monochrome, is the aforementioned section [M1m, M2m].

Next, averages nave (c) and nave (m) in these sections [M1c, M2c] and [M1m, M2m], respectively are computed in accordance with Equation (17) below, and standard deviations nstd (c) and nstd (m) are computed in accordance with Equation (18) below (step S444).

$$nave(c) = \frac{\sum_{k=M1c}^{M2c} k*f(k)}{\sum_{k=M1c}^{M2c} f(k)} \qquad (17)$$

$$nave(m) = \frac{\sum_{k=M1m}^{M2m} k*f(k)}{\sum_{k=M1m}^{M2m} f(k)}$$

$$nstd(c) = \left(\sum_{k=M1c}^{M2c} \left(f(k)*(k-nave(c)2)\right) \Big/ \sum_{k=M1c}^{M2c} f(k)\right)(1/2) \qquad$$

$$nstd(m) = \left(\sum_{k=M1m}^{M2m} \left(f(k)*(k-nave(m)2)\right) \Big/ \sum_{k=M1m}^{M2m} f(k)\right)(1/2) \qquad (18)$$

Then, by using these averages nave (c), nave (m) and standard deviations nstd (c), nstd (m), a threshold Tc of the correction curve for color image data and a threshold Tm of the correction curve for monochrome image data are computed in accordance with Equations (19) and (20) below (step S446).

$$Tc=\text{nave}(c)-C*nstd(c) \qquad (19)$$

$$Tm=\text{nave}(m)-C*nstd(m) \qquad (20)$$

Needless to mention, because of the difference in section setting, Tc and Tm here are in the relationship of Equation (21) below.

$$Tc>Tm \qquad (21)$$

Regarding this Equation (21), the reason for this relationship of Tc>Tm will be explained below, the explanation being simplified by supposing a case in which the frequency distribution is common and section [M1c, M2c] is narrower than section [M1m, M2m].

Both section [M1c, M2c] and section [M1m, M2m], though differing in width, contain a tone which takes on the highest frequency fmod, i.e. the mode nmod. Then the averages nave (c) and nave (m) of the respective sections, both of which contain the highest frequency fmod, are close to the mode nmod.

More specifically, the relationship of Equation (22) below holds.

$$\text{nave}(c) \approx \text{nave}(m) \approx \text{nmod} \quad (22)$$

On the other hand, since section [M1c, M2c] is narrower than section [M1m, M2m], the standard deviations nstd (c) and nstd (m) of the respective sections have the relationship of Equation (23) below.

$$\text{nstd}(c) < \text{nstd}(m) \quad (23)$$

This is for the following reason. A standard deviation is a statistical quantity indicating how individual values in a given distribution deviate from the average. Here is supposed a case in which a certain section is set and, after computing the standard deviation therein, the section is expanded at both ends, and the standard deviation is again computed for this expanded section. Since new deviations from the average are also counted in this computation of the standard deviation, the standard deviation is greater in the expanded section.

As the foregoing is also true of sections [M1c, M2c] and [M1m, M2m], Equation (23) holds. Therefore, it goes without saying that the relationship of Equation (21) derives from Equations (19), (20), (22) and (23) cited above.

Figure 29A:
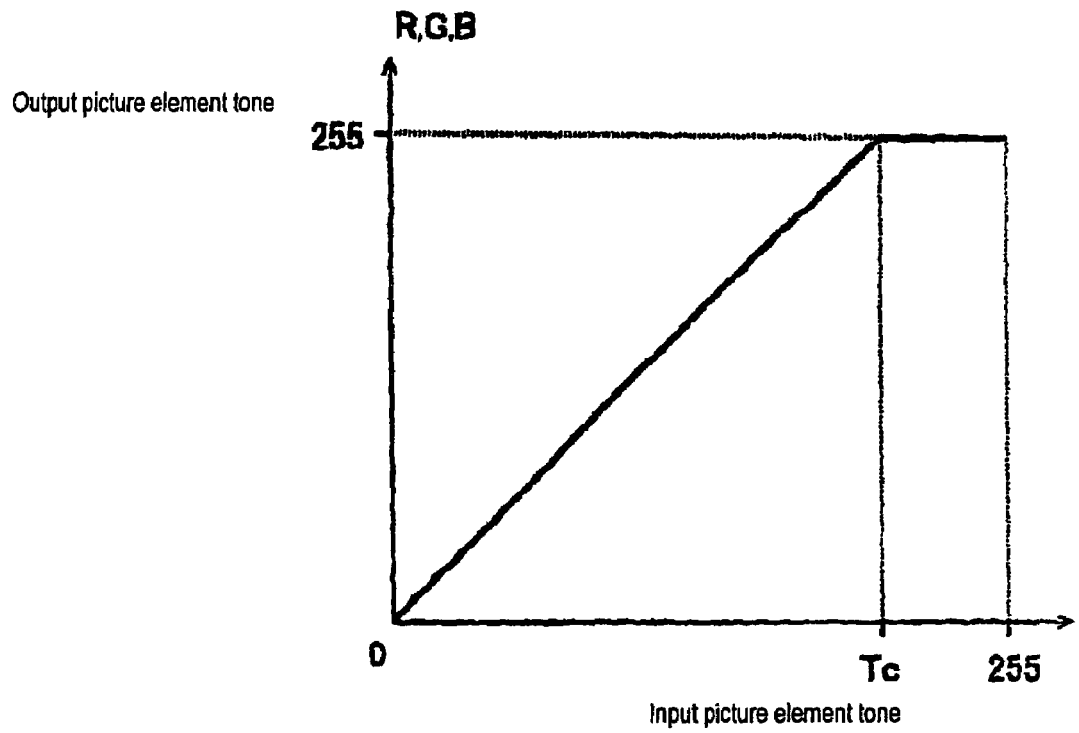
FIGS. 29A–29B illustrate an example of correction curve determined by the correction curve determination.
Figure 29B:
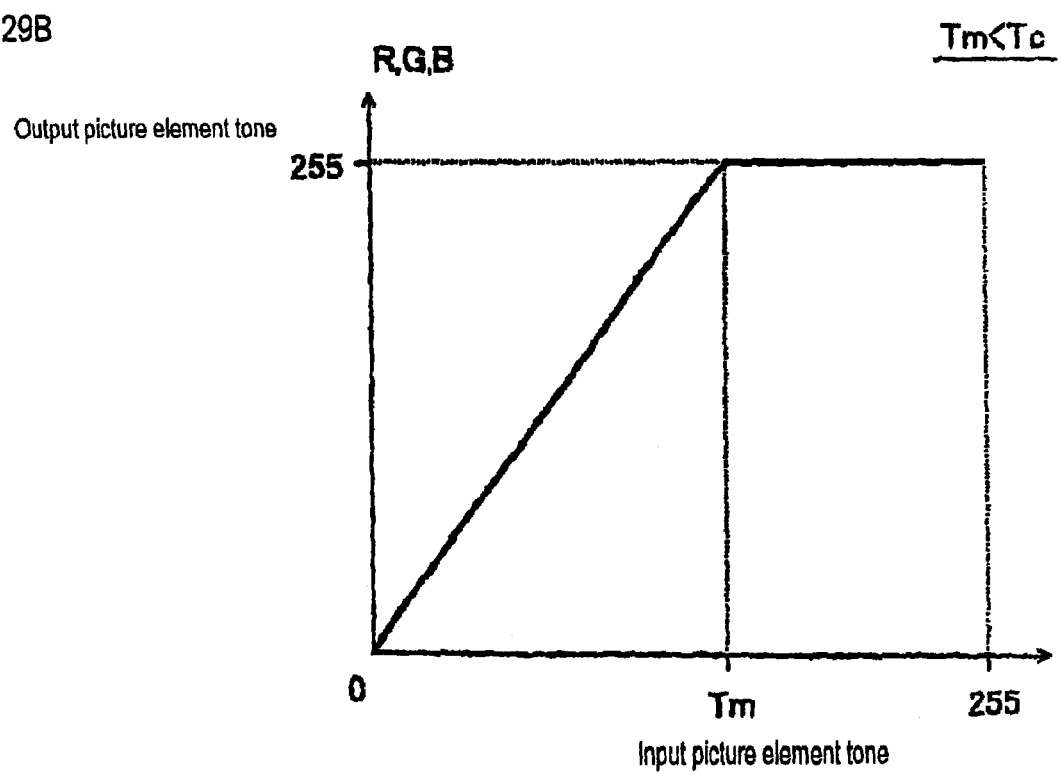

In this embodiment, C1 and C2 have a relationship that can be computed from Equation (13), with C1 set to be about 4, C2, about 2, and Cth1, about 0.7. When the thresholds Tc and Tm are computed in this way, the correction curves are determined at step S448. The correction curves are illustrated in FIGS. 29A and 29B. FIG. 29A shows a correction curve for color image data, while FIG. 29B shows a correction curve for monochrome image data. In this embodiment, input picture elements tones beyond the thresholds Tc and Tm are clamped to the output picture elements tone 255, and the range between input tones 0 and T is formed of a straight line having an inclination of 255/T.

Once the correction curves are determined as described above, the image data are corrected at step S450. Thus at step S455, the image data are acquired, and at steps S460 and S465 the output tones are computed by substituting the tones of color components in the picture elements into the correction curves. Upon completion of retouching of all the picture elements, the image data are stored onto the hard disk 36 at step S470 and, after color conversion and the like, delivered to the color printer 40 to execute printing.

If it is thus determined there is an area constituting a background, as the picture elements of substantial white close to the high tone are clamped to white, i.e. the highest tone in image data retouching, no ink is applied in the printing by the color printer 40 to the part of the print medium corresponding to this clamped part. Therefore, the part can be left as an area of unprinted blank paper. Or where the object of scanning is an image of monochrome image data, since the area to be determined as a background is broadly set from the high tone to the low tone, it is made possible by image data retouching to retouch the image in such a way that the contrast between the background blank paper area and black character part is clear, resulting in a contrasty, attractive image. Further, where the object of scanning is an image of color image data, since the area to be determined as a background is set narrower toward the high tone, it is made possible by image data retouching to prevent picture elements in the color part from being lost in the highlight.

INDUSTRIAL APPLICABILITY

As hitherto described, the present invention can provide a medium recording thereon an image data background determination control program for determining an area constituting a background in an image according to frequency distributions of image data and, if there is a background area, carries out prescribed retouching according to the background to provide contrast between the background and non-background parts of the image reproduced from the image data, Further, according to the second aspect of the invention, the determination can be easily executed because the presence or absence of a background in the image is determined to relative frequencies of an area demarcated by a prescribed tone.

Further, according to the third aspect of the invention, because the determination is done according to a relative frequency of the area demarcated by the prescribed tone, that frequency surpassing a prescribed threshold, the presence or absence of a background in the image can be determined more accurately.

Further, according to the fourth aspect of the invention, it is made possible to determine the presence or absence of a background in the image according to a standard deviation in the area demarcated by the prescribed tone.

Further, according to the fifth aspect of the invention, because the determination is done by combining another statistical quantity with the area demarcated by the prescribed tone, the presence of an area constituting a background can be determined more accurately.

Further, according to the sixth aspect of the invention, because the characteristic quantity is extracted from frequency distributions in which noise components contained in the entered image are reduced, the presence or absence of a background in the input image can be determined more precisely.

Further, according to the seventh aspect of the invention, prescribed image data retouching can be carried out according to the presence or absence of a background.

Further, according to the eighth aspect of the invention, the area near the highly constituting the background of the image can be removed by a simple technique.

Further, according to the ninth aspect of the invention, where there is any object, such as a photograph, in the input image, it is made possible to carry out satisfactory image data retouching.

Further, according to the 10th aspect of the invention, it is possible to provide an image data background determining apparatus capable not only of determining a background area suitable for the color components of the input image but also of carrying out retouching on the basis of an appropriately determined background, thereby to obtain an attractive output by preventing the loss of color components near the high tone in a color image or providing contrast between the background and characters or the like in a monochrome image.

Further, according to the 11th aspect of the invention, it is possible to designate the image data to be monochrome image data or color image data by the user's own choice instead of relying on the image data constituting the image, accordingly provide a more user-friendly environment.

Further, according to the 12th aspect of the invention, it is made possible to set a tone matching color image data or monochrome image data according to the identified trend of the image.

Further, according to the 13th aspect of the invention, it is possible to specifically present a difference between the tone setting method for color image data and that for monochrome image data.

Further, according to the 14th aspect of the invention, it is made possible to carry out retouching on image data acquired according to the area determined to be a background.

Further, according to the 15th aspect of the invention, it is made possible to provide an image data background determining method by which an area constituting a background in an image is determined according to frequency distributions of image data and, if there is a background area, prescribed retouching is carried out according to the background to provide contrast between the background and the non-background part of the image to be reproduced from the image data.

Further, according to the 16th aspect of the invention, it is made possible to provide a medium recording thereon a an image data background determination control program for determining an area constituting a background in an image according to frequency distributions of image data and, if there is a background area, carrying out prescribed retouching according to the background to provide contrast between the background and the non-background part of the image to be reproduced from the image data.

The invention claimed is:

1. An image data background determining apparatus, comprising:
   an image data acquisition unit for acquiring image data expressing in multiple tones an image in picture elements in a dot matrix arrangement;
   a frequency distribution charting unit for charting frequency distributions by totaling the picture elements of the image data acquired by the image data acquisition unit as classified by tone level;
   a background determination unit for computing a statistical quantity representing the characteristic of a reference area demarcated by dividing the frequency distributions based on a predescribed tone level and, if that statistical quantity is a sufficient value to indicate the presence of a background, determining that the image has an area constituting a background;
   an image data designating unit for designating the image data acquired by said image data acquisition unit to be either color image data or monochrome image data; and
   a tone setting unit for setting a tone to demarcate said reference area in response to the designation by said image data designating unit;
   wherein said background determination unit computes the relative frequencies of said reference area and, if either each or the total of the computed relative frequencies is at or above a prescribed threshold, determines that there is an area constituting a background in the image; and
   wherein said background determination unit computes representative values of said reference area, and determines whether there is an area constituting a background in the image by combining the representative values.

2. The image data background determining apparatus, as set forth in claim 1, wherein said background determination unit computes the relative frequency of each tone in said reference area and, when the total of the occurrences of tones having the prescribed or higher relative frequency is not less than a prescribed threshold, determines that there is a background area in the image.

3. The image data background determining apparatus, as set forth in claim 1, wherein said background determination unit computes the standard deviation of the reference area, and determines the presence of an area constituting a background in the image when the standard deviation is not above a prescribed threshold.

4. The image data background determining apparatus, as set forth in claim 1, wherein said background determination unit is provided with an image data retouching unit for so retouching the image data of picture elements, if the image has an area constituting a background, as to remove the background based on the area constituting the background.

5. The image data background determining apparatus, as set forth in claim 4, wherein said image data retouching unit, if the area constituting the background of the image is near a highlight, generates a correction curve having a parameter to maximize the tone of picture elements near the highlight, and corrects the tones of picture elements in the image data according to the correction curve.

6. The image data background determining apparatus, as set forth in claim 5, wherein said background determination unit determines the presence or absence of an object in the image in accordance with prescribed technique and, if there is found an object, said image data retouching unit alters the parameter of said correction curve.

7. The image data background determining apparatus, as set forth in claim 1, wherein said image data designating unit designates the image data to be monochrome image data or color image data by the user's choice.

8. The image data background determining apparatus, as set forth in claim 1, wherein said tone setting unit sets the tone to demarcate the reference area variably based on the state of the frequency distributions.

9. The image data background determining apparatus, as set forth in claim 8, wherein said tone setting unit sets, where the designation by the image data designating unit is for color image data, said reference area narrower toward the high tone or, where it is for monochrome image data, sets said reference area wider than for color image data from the high tone to the low tone.

10. The image data background determining apparatus, as set forth in claim 9, wherein said background area determination unit generates a retouching curve having as its parameter the tone designated by said tone designating unit, and retouches the picture elements of the image data acquired by said image data acquisition unit based on the retouching curve.

11. An image data background determining method for determining an area constituting a background in an image based on frequency distributions of image data, comprising:
   acquiring image data, with an image data acquisition unit, expressing in multiple tones an image in picture elements in a dot matrix arrangement;
   charting frequency distributions by totaling the picture elements of the image data acquired at said image data acquisition unit as classified by tone level;
   computing a statistical quantity, with a background determination unit, representing the characteristic of a reference area demarcated by dividing said frequency distributions based on a prescribed tone level and, if that statistical quantity is a sufficient value to indicate the presence of a background, determine that said image has an area constituting a background;

designating the image data, with an image data designation unit, acquired by said image data acquisition unit to be either color image data or monochrome image data; and setting a tone, with a tone setting unit, to demarcate said reference area in response to the designation by said image data designating unit;

wherein said background determination unit computes the relative frequencies of said reference area and, if either each or the total of the computed relative frequencies is at or above a prescribed threshold, determines that there is an area constituting a background in the image; and wherein said background determination unit computes representative values of said reference area, and determines whether there is an area constituting a background in the image by combining the representative values.

12. A computer readable medium with a recording thereon of an image data background determination control program for determining an area constituting a background in an image based on frequency distributions of the image data, which enables a computer to carry out a method, comprising:

acquiring image data, with an image data acquisition unit, expressing in multiple tones an image in picture elements in a dot matrix arrangement;

charting frequency distributions by totaling the picture elements of the image data acquired at said image data acquisition unit as classified by tone level;

computing a statistical quantity, with a background determination unit, representing the characteristic of a reference area demarcated by dividing said frequency distributions according to a prescribed tone level and, if that statistical quantity is a sufficient value to indicate the presence of a background, determine that said image has an area constituting a background;

designating the image data, with an image data designation unit, acquired by said image data acquisition unit to be either color image data or monochrome image data; and setting a tone to demarcate said reference area in response to the designation by said image data designating unit;

wherein said background determination unit computes the relative frequencies of said reference area and, if either each or the total of the computed relative frequencies is at or above a prescribed threshold, determines that there is an area constituting a background in the image; and wherein said background determination unit computes representative values of said reference area, and determines whether there is an area constituting a background in the image by combining the representative values.

13. An image data background determining apparatus, comprising:

an image data acquisition unit for acquiring image data expressing in multiple tones an image in picture elements in a dot matrix arrangement;

a frequency distribution charting unit for charting frequency distributions by totaling the picture elements of the image data acquired by the image data acquisition unit as classified by tone level;

a background determination unit for computing a statistical quantity representing the characteristic of a reference area demarcated by dividing the frequency distributions based on a predescribed tone level and, if that statistical quantity is a sufficient value to indicate the presence of a background, determining that the image has an area constituting a background;

an image data designating unit for designating the image data acquired by said image data acquisition unit to be either color image data or monochrome image data; and a tone setting unit for setting a tone to demarcate said reference area in response to the designation by said image data designating unit;

wherein said background determination unit applies, in computing statistical values in said reference area, and in smoothing to the frequency distributions.

14. An image data background determining apparatus, comprising:

an image data acquisition unit for acquiring image data expressing in multiple tones an image in picture elements in a dot matrix arrangement;

a frequency distribution charting unit for charting frequency distributions by totaling the picture elements of the image data acquired by the image data acquisition unit as classified by tone level;

a background determination unit for computing a statistical quantity representing the characteristic of a reference area demarcated by dividing the frequency distributions based on a predescribed tone level and, if that statistical quantity is a sufficient value to indicate the presence of a background, determining that the image has an area constituting a background;

an image data designating unit for designating the image data acquired by said image data acquisition unit to be either color image data or monochrome image data; and a tone setting unit for setting a tone to demarcate said reference area in response to the designation by said image data designating unit;

wherein said tone setting unit sets, where the designation by the image data designating unit is for color image data, said reference area narrower toward the high tone or, where it is for monochrome image data, sets said reference area wider than for color image data from the high tone to the low tone.

15. The image data background determining apparatus, as set forth in claim 14, wherein said background determination unit applies, in computing statistical values in said reference area, and in smoothing to the frequency distributions.

16. An image data background determining method for determining an area constituting a background in an image based on frequency distributions of image data, comprising:

acquiring image data, with an image data acquisition unit, expressing in multiple tones an image in picture elements in a dot matrix arrangement;

charting frequency distributions by totaling the picture elements of the image data acquired at said image data acquisition unit as classified by tone level;

computing a statistical quantity, with a background determination unit, representing the characteristic of a reference area demarcated by dividing said frequency distributions based on a prescribed tone level and, if that statistical quantity is a sufficient value to indicate the presence of a background, determine that said image has an area constituting a background;

designating the image data, with an image data designation unit, acquired by said image data acquisition unit to be either color image data or monochrome image data; and setting a tone, with a tone setting unit, to demarcate said reference area in response to the designation by said image data designating unit;

wherein said background determination unit applies, in computing statistical values in said reference area, and in smoothing the frequency distributions.

17. An image data background determining method for determining an area constituting a background in an image based on frequency distributions of image data, comprising:
acquiring image data, with an image data acquisition unit, expressing in multiple tones an image in picture elements in a dot matrix arrangement;
charting frequency distributions by totaling the picture elements of the image data acquired at said image data acquisition unit as classified by tone level;
computing a statistical quantity, with a background determination unit, representing the characteristic of a reference area demarcated by dividing said frequency distributions based on a prescribed tone level and, if that statistical quantity is a sufficient value to indicate the presence of a background, determine that said image has an area constituting a background;
designating the image data, with an image data designation unit, acquired by said image data acquisition unit to be either color image data or monochrome image data; and
setting a tone, with a tone setting unit, to demarcate said reference area in response to the designation by said image data designating unit;
wherein said tone setting unit sets, where the designation by the image data designating unit is for color image data, said reference area narrower toward the high tone or, where it is for monochrome image data, sets said reference area wider than for color image data from the high tone to the low tone.

18. The image data background determining method of claim 17, wherein said background determination unit computes the relative frequencies of said reference area and, if either each or the total of the computed relative frequencies is at or above a prescribed threshold, determines that there is an area constituting a background in the image.

19. The image data background determining method of claim 17, wherein said background determination unit computes the relative frequency of each tone in said reference area and, when the total of the occurrences of tones having the prescribed or higher relative frequency is not less than a prescribed threshold, determines that there is a background area in the image.

20. The image data background determining method of claim 17, wherein said background determination unit computes the standard deviation of the reference area, and determines the presence of an area constituting a background in the image when the standard deviation is not above a prescribed threshold.

21. The image data background determining method of claim 17, wherein said background determination unit computes representative values of said reference area, and determines whether there is an area constituting a background in the image by combining the representative values.

22. The image data background determining method of claim 21, wherein said background determination unit applies, in computing statistical values in said reference area, and in smoothing to the frequency distributions.

23. The image data background determining method of claim 17, wherein said background determination unit is provided with an image data retouching unit for so retouching the image data of picture elements, if the image has an area constituting a background, as to remove the background based on the area constituting the background.

24. The image data background determining method of claim 23, wherein said image data retouching unit, if the area constituting the background of the image is near a highlight, generates a correction curve having a parameter to maximize the tone of picture elements near the highlight, and corrects the tones of picture elements in the image data according to the correction curve.

25. The image data background determining method of claim 24, wherein said background determination unit determines the presence or absence of an object in the image in accordance with prescribed technique and, if there is found an object, said image data retouching unit alters the parameter of said correction curve.

26. The image data background determining method of claim 17, wherein said image data designating unit designates the image data to be monochrome image data or color image data by a user's choice.

27. The image data background determining method of claim 17, wherein said tone setting unit sets the tone to demarcate the reference area variably based on the state of the frequency distributions.

28. The image data background determining method of claim 17, wherein said background area determination unit generates a retouching curve having as its parameter the tone designated by said tone designating unit, and retouches the picture elements of the image data acquired by said image data acquisition unit based on the retouching curve.

* * * * *